(12) United States Patent
Gundeti

(10) Patent No.: US 11,176,933 B1
(45) Date of Patent: Nov. 16, 2021

(54) PRECOMPUTED COMMUNICATION PARAMETERS

(71) Applicant: Amazon Technologies, Inc., Seattle, WA (US)

(72) Inventor: Vikram Kumar Gundeti, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 553 days.

(21) Appl. No.: 16/119,803

(22) Filed: Aug. 31, 2018

(51) Int. Cl.
| | |
|---|---|
| *G10L 15/22* | (2006.01) |
| *G10L 19/00* | (2013.01) |
| *G10L 15/18* | (2013.01) |
| *H04L 12/28* | (2006.01) |
| *G10L 15/28* | (2013.01) |
| *H04L 29/08* | (2006.01) |

(52) U.S. Cl.
CPC .......... *G10L 15/22* (2013.01); *G10L 15/1815* (2013.01); *G10L 15/28* (2013.01); *G10L 19/00* (2013.01); *H04L 12/282* (2013.01); *H04L 67/306* (2013.01)

(58) Field of Classification Search
CPC ..... G10L 15/22; G10L 15/1815; G10L 15/28; G10L 19/00; H04L 67/306; H04L 12/282
USPC ........................................................ 704/235
See application file for complete search history.

(56) References Cited

U.S. PATENT DOCUMENTS 9,431,021 B1 * 8/2016 Scalise .................... G10L 21/00

* cited by examiner

*Primary Examiner* — Thierry L Pham
(74) *Attorney, Agent, or Firm* — Lee & Hayes, P.C.

(57) ABSTRACT

Systems and methods for precomputed communication parameters are disclosed. A request to establish a communication channel may be received from a first device at a remote system. The remote system may query precached communication parameters associated with the first device to identify modalities and/or codecs associated with the first device. The remote system may also identify the second device to establish the communication channel with and may identify modalities and/or codecs associated with the second device, such as by utilizing user accounts associated with the devices. A transport-address type may be identified, such as based on whether the devices are associated with the same network access point identifier and/or based on past communication channels established between the devices.

20 Claims, 11 Drawing Sheets

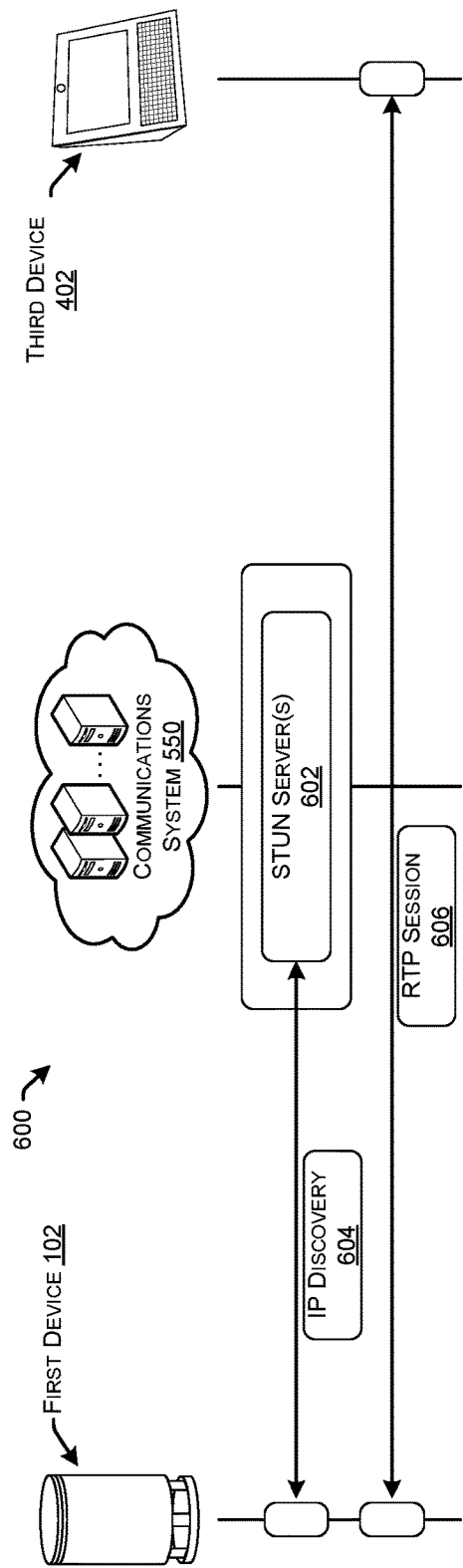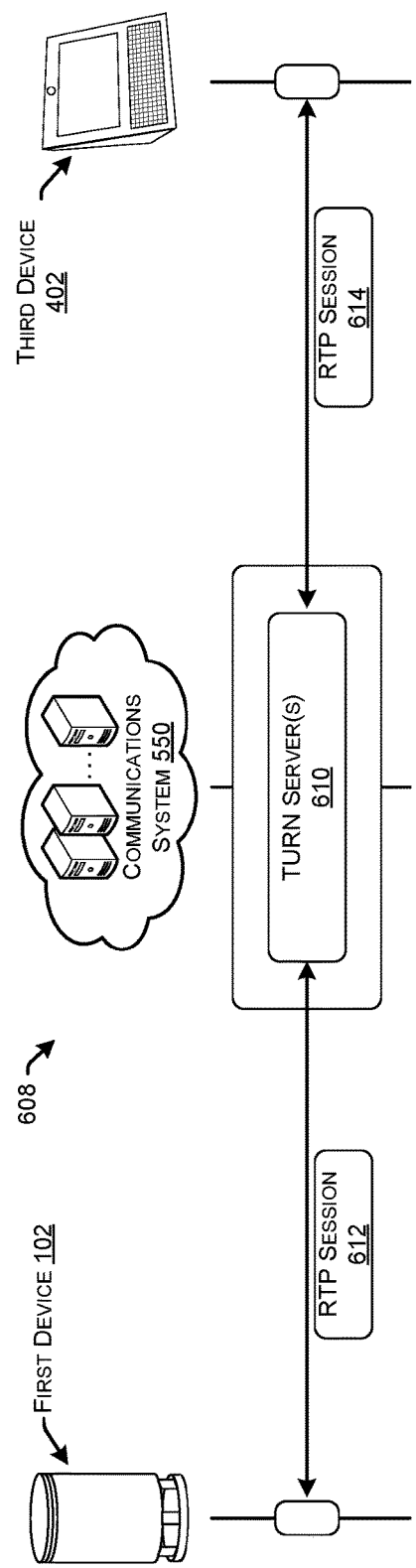

PRECOMPUTED COMMUNICATION PARAMETERS

BACKGROUND

A variety of devices may be configured to communicate with each other, such as via audio and/or video. Establishing communication sessions between devices can include processes that introduce latency to establishing such sessions. Described herein are improvements in technology and solutions to technical problems that can be used to, among other things, decrease latency when establishing communication sessions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 6A and 6B illustrate example components for a communications system to establish a flow of data between devices.

DETAILED DESCRIPTION

Figure 1:
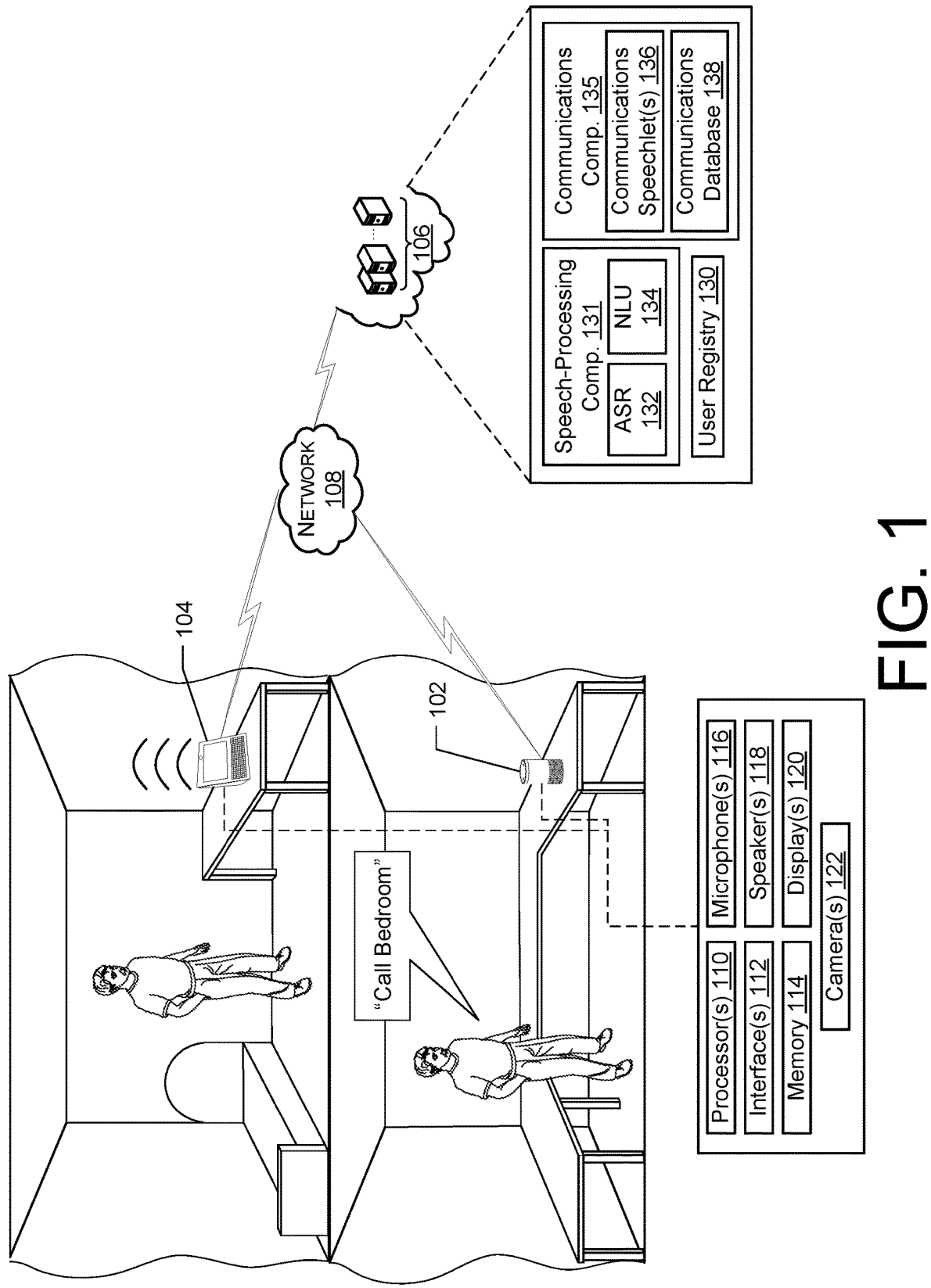
FIG. 1 illustrates a schematic diagram of an example environment for generating and/or utilizing precomputed communication parameters.

Systems and methods for precomputing communication parameters and/or utilizing precomputed communication parameters for establishing communication sessions are disclosed. Take, for example, two electronic devices, such as two voice-enabled devices. The first device may be located in one area of an environment, such as in an office of a home, while the second device may be located in another area of the environment, such as in a bedroom of the home. A user located in the office may desire to utilize the first device to establish a communication session, such as an audio and/or video communications session, with the second device. In examples where the first device is a voice-enabled device, the user may provide a user utterance, such as "call bedroom." One or more microphones of the first device may capture audio corresponding to the user utterance and may generate corresponding audio data. The first device may send the audio data to a remote system for speech processing. For example, the remote system may utilize automatic speech recognition techniques to generate text data corresponding to the audio data, and natural language understanding techniques may be utilized to generate intent data corresponding to the text data. The intent data may indicate an intent to establish a communication channel with a device identified as "bedroom." The remote system may determine a device identifier associated with a device named "bedroom," and in so doing the remote system may determine that the intent is to establish a communication channel between a first device identifier associated with the first device and a second device identifier associated with the second device.

Additionally, or alternatively, the innovations described herein may be initiated and/or implemented utilizing types of input data other than audio data, such as input data representing inputs to a graphical user interface of a device associated with the user. In these examples, the input data may be used instead of or in addition to the audio data to precompute communication parameters.

Generally, establishing such a communication channel involves dynamic determinations of the parameters associated with the communication channel. For example, a modality, codec, and transport-address type are generally-utilized parameters for determining how to establish a communication channel. The modality may include the type(s) of data that may be sent and/or received by the first device and the second device. For example, the first device may be configured to send and/or receive audio data but not video data. The second device may be configured to send and/or receive audio data and video data. The codec may include a device and/or program that compresses data, such as to enable fast transmission, and/or that decompresses received data. The transport-address type may include, for example, a host type associated with a network access point identifier, a server-reflexive type associated with utilizing public network access point identifiers associated with the devices, and/or a relay type associated with utilizing a relay server to send and receive data associated with the communication. Systems that establish communication channels may receive parameter candidates generated and sent from the first device. The systems may then call for parameter candidates generated by the second device. The systems may then attempt to determine which parameters to utilize given the parameter candidates from the first device and the parameter candidates from the second device. This process is generally performed when each communication channel is established.

To improve this, communication parameters are precomputed to reduce or eliminate the need for dynamic parameter determinations when establishing communication channels. For example, the first and second devices may be associated with the remote system prior to the request to establish a communication session. When a device is set up for use, that device may be associated with a user account. During setup, a device identifier associated with the device may be sent to the remote system and may be associated with the user account. Based at least in part on the device identifier, the remote system may identify and/or determine a device type associated with the device. The device type and/or device identifier may be utilized to identify a modality associated with the device and a codec associated with the device. Information indicating the available modality and codec may be stored in association with the user account, and/or the information may be stored in a separate database, such as a communications database, that may be configured for utilization when establishing a communication channel.

Additionally, during the setup process and/or when a user provides a user utterance and/or other input to the device, data may be sent to the remote system indicating the network access point identifier associated with the device and/or one or more transport-address types available to and/or utilized by the device. This information may also be stored in the user account and/or communications database. The identification of modalities, codecs, network access point identifiers, and transport-address types, among other things, may also be performed with respect to the second device and/or one or more other devices that are associated with the remote system. It should be understood that while example communication parameters have been provided and described herein, such as modalities, codecs, and transport-address types, the present disclosure includes the precomputation of any and all communication parameters, whether existing now or in the future, that may be utilized to establish a communication channel.

Returning to the example provided above, the user may provide a user utterance to the first device, such as "call bedroom." The first device may send audio data corresponding to the user utterance to the remote system for speech processing. The speech-processing system may generate intent data that may indicate an intent to establish a communication channel with a device identified as "bedroom," which may be performed by a communications component. The communications component may determine a device identifier associated with a device named "bedroom," and in so doing the communications component may determine that the intent is to establish a communication channel between a first device identifier associated with the first device and a second device identifier associated with the second device.

The communications component may attempt to identify communication parameters to effectuate the intent of establishing the communication channel. To do so, the communications component may access information stored in association with the user account and/or communications database. In the example provided above, the communications component may access the information indicating the modalities and the codecs associated with the first device, and the communications component may access the information indicating the modalities and the codecs associated with the second device. This information may be accessed without the communications component requesting such information from either device. The communications component may also determine whether the first device and the second device are associated with the same network access point identifier. In examples where the devices are associated with the same network access point identifier, a host transport-address type that utilizes the network access point may be selected for use. In these examples, the communications component has identified the communication parameters to be use and may utilize those parameters to establish the communication channel.

Additionally, or alternatively, in examples where the first device and the second device are not associated with the same network access point identifier and/or when communications between the devices using the network access point are indicated as less than favorable, the communications component may attempt to identify alternate transport-address types, such as server-reflexive types and/or relay types. In examples, as described herein, information indicating which transport-address types are available to and/or are utilized by the first device and the second device may be stored in association with the user account and/or the communications database. One or more of these data sources may be queried to determine the transport-address types available to each device. The communications component may then determine which transport-address type is associated with both devices and/or which transport-address type is indicated to be most favorable for use. The communications component may then utilize the identified transport-address type, along with the identified modality and codec(s), to establish the communication channel.

Additionally, or alternatively, a previous communication channel configuration may have been utilized between the first device and the second device. Information indicating which modality, codec(s), and transport-address type was utilized with respect to that previous communication channel configuration may be stored in association with the user account and/or the communications database. This information may additionally, or alternatively, be utilized to identify the modality, codec(s), and/or transport-address types to be utilized when establishing a communication channel between the first device and the second device.

Additionally, or alternatively, the codecs utilized by various devices associated with the remote system may be periodically updated. In these examples, such as when the remote system is involved in codec updates, the information indicating which codec(s) are associated with which devices may be replaced with information indicating the updated codec(s). This information indicating the updated codec(s) may be utilized to identify the codec(s) to utilize when establishing a communication channel.

It should be noted that while communication channels are described as being established between two devices, communications channels as described herein may be established in association with devices and/or other systems and/or services. For example, a third-party communication system and/or servers associated therewith may be utilized to establish a communication channel and may benefit from precomputed communication parameters as described herein.

Additionally, or alternatively, the first device may be associated with a first environment, such as a first home, and the second device may be associated with a second environment, such as a second home. In these examples, users of the devices may be presented with an option to permit communication channels to be established between the devices as described herein. When user accounts associated with the devices indicate that such permissions have been provided with respect to both devices, the information related to modalities, codecs, and transport-address types may be generated and stored.

Additionally, or alternatively, a communication channel may be established between more than two devices. In these examples, information indicating modalities, codecs, and transport-address types may be stored as described herein for the third device. When establishing the communication channel, the remote system may identify the communication parameters associated with the three devices and utilize that information to select a modality, codec(s), and a transport-address type to be utilized.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates a schematic diagram of an example system 100 for generating precomputed communication parameters and/or utilizing precomputed communication parameters for establishing a communication channel. The system 100 may include, for example, a first device 102 and a second device 104. The first device 102 and/or the second device 104 may be voice-enabled devices configured to receive user utterances and perform operations in response to such user utterances. In these examples, the first device 102 and/or the second device 104 may be "hands free" such that interactions with the devices are performed through audible requests and responses. The first device 102 may be located or otherwise situated in a first space and/or environment. The second device 104 may be located or otherwise situated in a second space and/or environment. As shown by way of example in FIG. 1, the first device 102 is located in an "office" while the second device 104 is located in a "bedroom." It should be understood that the devices may be located in spaces other than those specifically mentioned in this disclosure. It should also be understood that while the spaces depicted in FIG. 1 are rooms, the spaces and environments may be any space and/or environment. By way of example, an environment may include a building, a room, an outdoor space, a collection of rooms and/or spaces, and/or a given region, such as a region serviced by a signal from a wireless router.

The first device 102 and the second device 104 may be configured to send data to and receive data from a remote system 106, such as via a network 108. The first device 102 and/or the second device 104 may include one or more components, such as, for example, one or more processors 110, one or more network interfaces 112, memory 114, one or more microphones 116, one or more speakers 118, one or more displays 120, and/or one or more cameras 122. The microphones 116 may be configured to capture audio, such as user utterances, and generate corresponding audio data. The speakers 118 may be configured to output audio, such as audio corresponding to audio data receive from another device and/or the remote system 106. The displays 120 may be configured to present images, such as images corresponding to image data receive from another device and/or the remote system 106. The cameras 122 may be configured to capture images and to generate corresponding image data.

The remote system 106 may include components such as, for example, a user registry 130, a speech-processing component 131, which may include an automatic speech recognition (ASR) component 132 and a natural language understanding (NLU) component 134, and/or a communications component 135, which may include a communications speechlet(s) 136 and/or a communications database 138. Each of the components described herein with respect to the remote system 106 may be associated with their own systems which collectively may be referred to herein as the remote system 106, and/or some or all of the components may be associated with a single system. In examples, some or each of the components of the remote system 106 may include their own processor(s), network interface(s), and/or memory. As such, by way of example, the speech-processing component 131 may include and/or be associated with processor(s), network interface(s), and/or memory. The communications component 135 may include and/or be associated with different processor(s), network interface(s), and/or memory, or the communications component 135 may utilize some or all of the same processor(s), network interface(s), and/or memory utilized by the speech-processing component 131. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized. These components are described in detail below.

The user registry component 130 may be configured to identify, determine, and/or generate associations between users, user accounts, and/or devices. For example, one or more associations between user accounts may be identified, determined, and/or generated by the user registry 130. The user registry 130 may additionally store information indicating one or more applications and/or resources accessible to and/or enabled for a given user account. Additionally, the user registry 130 may include information indicating device identifiers associated with a given user account, as well as device types associated with the device identifiers. The user registry 130 may also include information indicating modalities, codecs, and/or transport-address types associated with the device identifiers and/or the device types. It should also be understood that the term "user account" may be used to describe a set of data and/or functionalities associated with a given account identifier. For example, data identified, determined, and/or generated while using some or all of the system 100 may be stored or otherwise associated with an account identifier and/or profile identifier. Data associated with the user accounts and/or profiles may include, for example, account/profile access information, historical usage data, device-association data, and/or preference data.

The speech-processing component 131 may be configured to receive audio data from the first device 102, for example, and perform speech processing operations. For example, the ASR component 132 may be configured to receive the audio data, which may represent human speech such as user utterances, and generate text data corresponding to the audio data. The text data may include words corresponding to the human speech. The NLU component 134 may be configured to determine one or more intents associated with the human speech based at least in part on the text data. The ASR component 132 and the NLU component 134 are described in more detail below with respect to FIG. 9. For purposes of illustration, the ASR component 132 and the NLU component 134 may be utilized to determine an intent to establish a communication channel between devices. The ASR component 132 and the NLU component 134 may also be utilized to determine a device identifier associated with a device that a user has requested to establish a communication session with.

For example, a user may speak a user utterance to the first device 102. The microphones 116 of the first device 102 may capture audio representing the user utterance and may generate corresponding audio data. The audio data may be sent, via the network 108, to the speech-processing component 131. The ASR component 132 may process the audio data and generate corresponding text data. The NLU component 134 may utilize the text data to determine intent data representing an intent of the user to, in these examples, establish a communication channel with another device, such as the second device 104. For example, the user utterance may be "call bedroom." The speech-processing component 131, utilizing the NLU component 134, may determine that the text data corresponds to an intent to "call" or otherwise establish a communication channel with another device. The NLU component 134 may also be utilized to determine one or more values or fields associated with the "call" intent. Here, for example, the value may include "bedroom" as a naming indicator of the device that is to be called. In these examples, and based at least in part on the NLU component 134 identifying the intent as a "call" intent, one or more communications speechlets 136 of the communications component 135 may be utilized to start the process of establishing a communication channel between the first device 102 and the second device 104. It should be appreciated that the establishment of communications as described herein may include establishment of any synchronous communication channel. For example, the communication channel may be a "call" where the request to establish the communication channel may be "answered" using the second device 104. By way of further example, the communication channel may be an "intercom" or "drop in" where the request to establish the communication channel may not require an answer by the second device 104, but instead the communication channel may be established without receiving user action with respect to the second device 104.

As described above, the speech-processing component 131 may send data to and/or receive data from the communications component 135, such as via the communications speechlet(s) 136. The communications speechlet(s) 136 may receive the intent data from the NLU component 134 and may utilize the intent data to identify, determine, and/or generate communication parameters to be utilized to establish a communication channel, such as between the first device 102 and the second device 104. The communications speechlet(s) 136 may attempt to identify communication parameters to effectuate the intent of establishing the communication channel. To do so, the communications speechlet(s) 136 may access information stored in association with the user registry 130 and/or the communications database 138, as described more fully below. In the example provided above, the communications speechlet(s) 136 may access the information indicating the modalities and the codecs associated with the first device 102, and the communications speechlet(s) 136 may access the information indicating the modalities and the codecs associated with the second device 104. This information may be accessed without the remote system 106 requesting such information from either device 102, 104. The communications speechlet(s) 136 may also determine whether the first device 102 and the second device 104 are associated with the same network access point identifier. In examples where the devices 102, 104 are associated with the same network access point identifier, a host transport-address type that utilizes the network access point may be selected for use. In these examples, the communications speechlet(s) 136 may have identified the communication parameters to be used and may utilize those parameters to establish the communication channel.

Additionally, or alternatively, in examples where the first device 102 and the second device 104 are not associated with the same network access point identifier and/or when communications between the devices 102, 104 using the network access point are indicated as less than favorable, the communications speechlet(s) 136 may attempt to identify alternate transport-address types, such as server-reflexive types and/or relay types. In examples, as described herein, information indicating which transport-address types are available to and/or are utilized by the first device 102 and the second device 104 may be stored in association with the user registry 130 and/or the communications database 138. One or more of these data sources may be queried to determine the transport-address types available to each device 102, 104. The communications speechlet(s) 136 may then determine which transport-address type is associated with both devices 102, 104 and/or which transport-address type is indicated to be most favorable for use. The communications speechlet(s) 136 may then utilize the identified transport-address type, along with an identified modality and codec(s), to establish the communication channel. In examples, the communications speechlet(s) 136 may generate directive data representing a directive for one or more other components of the remote system 106 and/or another system to establish the communication channel.

As used herein, the modalities may include, for example, the types of data that may be transferred to and from a given device. Example modalities may include audio data, image data, video data, tactile data, and/or a combination thereof. The codec(s) may include a device and/or program that compresses data, such as to enable fast transmission, and/or that decompresses received data. The transport-address type may include, for example, a host type associated with a network access point identifier, a server-reflexive type associated with utilizing public network access point identifiers associated with the devices, and/or a relay type associated with utilizing a relay server to send and receive data associated with the communication.

Additionally, or alternatively, a previous communication channel configuration may have been utilized between the first device 102 and the second device 104. Information indicating which modality, codec(s), and transport-address type was utilized with respect to that previous communication channel configuration may be stored in association with the user registry 130 and/or the communications database 138. This information may additionally, or alternatively, be utilized to identify the modality, codec(s), and/or transport-address types to be utilized when establishing a communication channel between the first device 102 and the second device 104.

Additionally, or alternatively, the codecs utilized by various devices associated with the remote system 106 may be periodically updated. In these examples, such as when the remote system 106 is involved in codec updates, the information indicating which codec(s) are associated with which devices may be replaced with information indicating the updated codec(s). This information indicating the updated codec(s) may be utilized to identify the codec(s) to utilize when establishing a communication channel.

It should be understood that while examples are provided where the remote system 106 receives audio data representing a user utterance requesting establishment of a communication channel, the innovations described herein may additionally or alternatively be initiated and/or implemented utilizing other types of input data, such as input data representing inputs to a graphical user interface of a device associated with the user. In these examples, the input data may be used instead of or in addition to the audio data to precompute communication parameters.

The speechlet(s) 136 described herein may include a speech-enabled web component that may run in the remote system 106. Speechlet(s) 136 may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component 134 may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

The communications database 138 may be configured to store information associated with establishing communication channels between devices. For example, the first device 102 and the second device 104 may be associated with the remote system 106 prior to the request to establish a communication session. When a device is setup for use, that device may be associated with a user account. During setup, a device identifier associated with the device may be sent to the remote system 106 and may be associated with the user account. Based at least in part on the device identifier, the remote system 106 may identify and/or determine a device type associated with the device. The device type and/or device identifier may be utilized to identify a modality associated with the device and a codec associated with the device. Information indicating the available modality and codec may be stored in association with the user account, such as in the user registry 130, and/or the information may be stored in a separate database, such as the communications database 138, that may be configured for utilization when establishing a communication channel.

Additionally, during the setup process and/or when a user provides a user utterance to the device, data may be sent to the remote system 106 indicating the network access point identifier associated with the device and/or one or more transport-address types available to and/or utilized by the device. This information may also be stored in the user registry 130. The identification of modalities, codecs, network access point identifiers, and transport-address types may also be performed with respect to the second device 104 and/or one or more other devices that are associated with the remote system 106.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the components of the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112 and/or the network interface(s) associated with the components of the remote system 106 may enable messages between the components and/or devices shown in system 100 and/or with one or more other remote systems, as well as other networked devices. Such network interface(s) 112 and/or the network interface(s) associated with the components of the remote system 106 may include one or more network interface controllers (NICs) or other types of transceiver devices to send and receive messages over the network 108.

For instance, each of the network interface(s) 112 and/or the network interface(s) associated with the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) associated with the components of the remote system 106 may include a wide area network (WAN) component to enable message over a wide area network.

In some instances, the remote system 106 may be local to an environment associated the first device 102 and/or the second device 104. For instance, the remote system 106 may be located within the first device 102 and/or the second device 104. In some instances, some or all of the functionality of the remote system 106 may be performed by the first device 102 and/or the second device 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
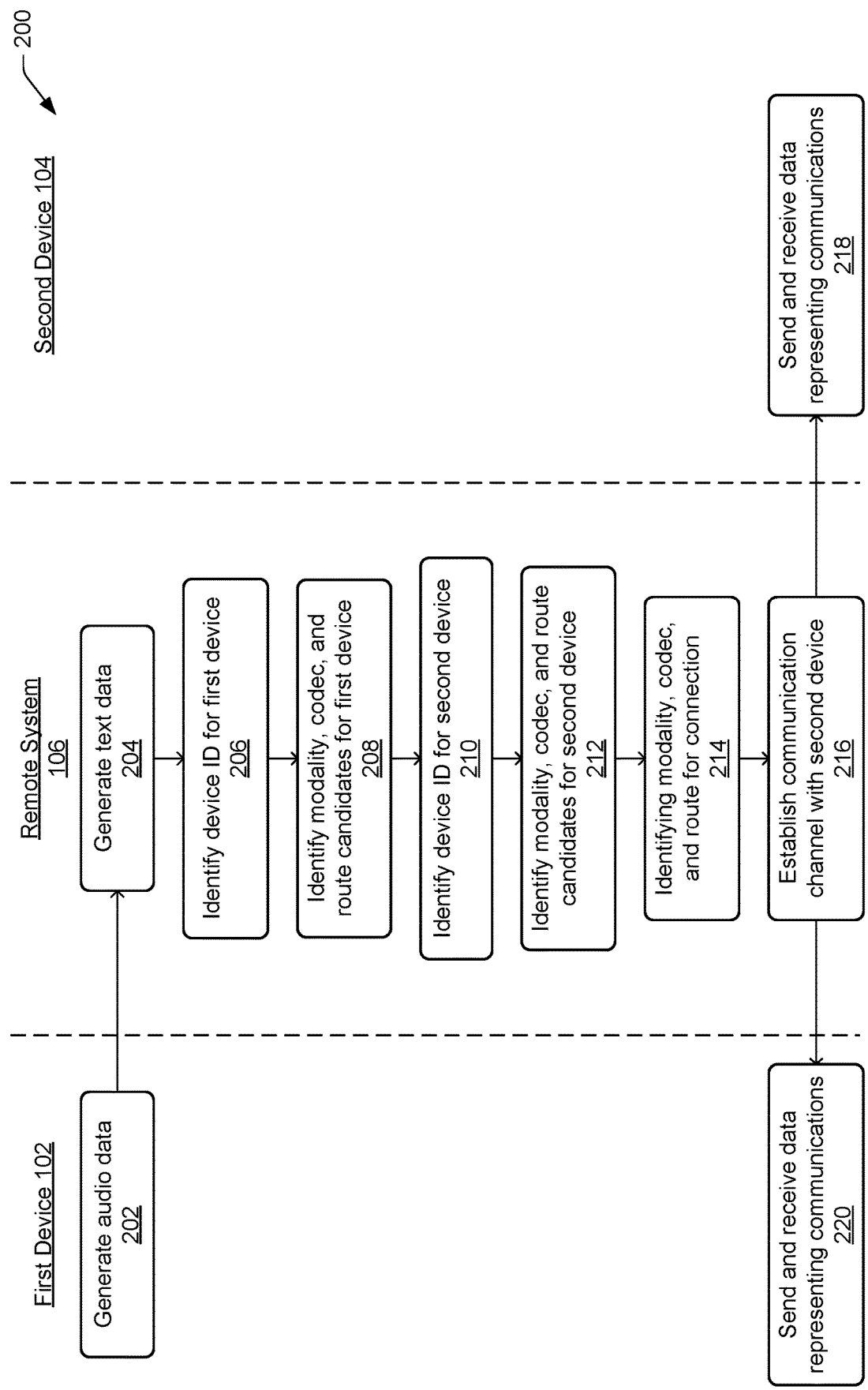
FIG. 2 illustrates a flow diagram of an example process for precomputing and/or utilizing precomputed communication parameters for establishing communication sessions.
Figure 3:
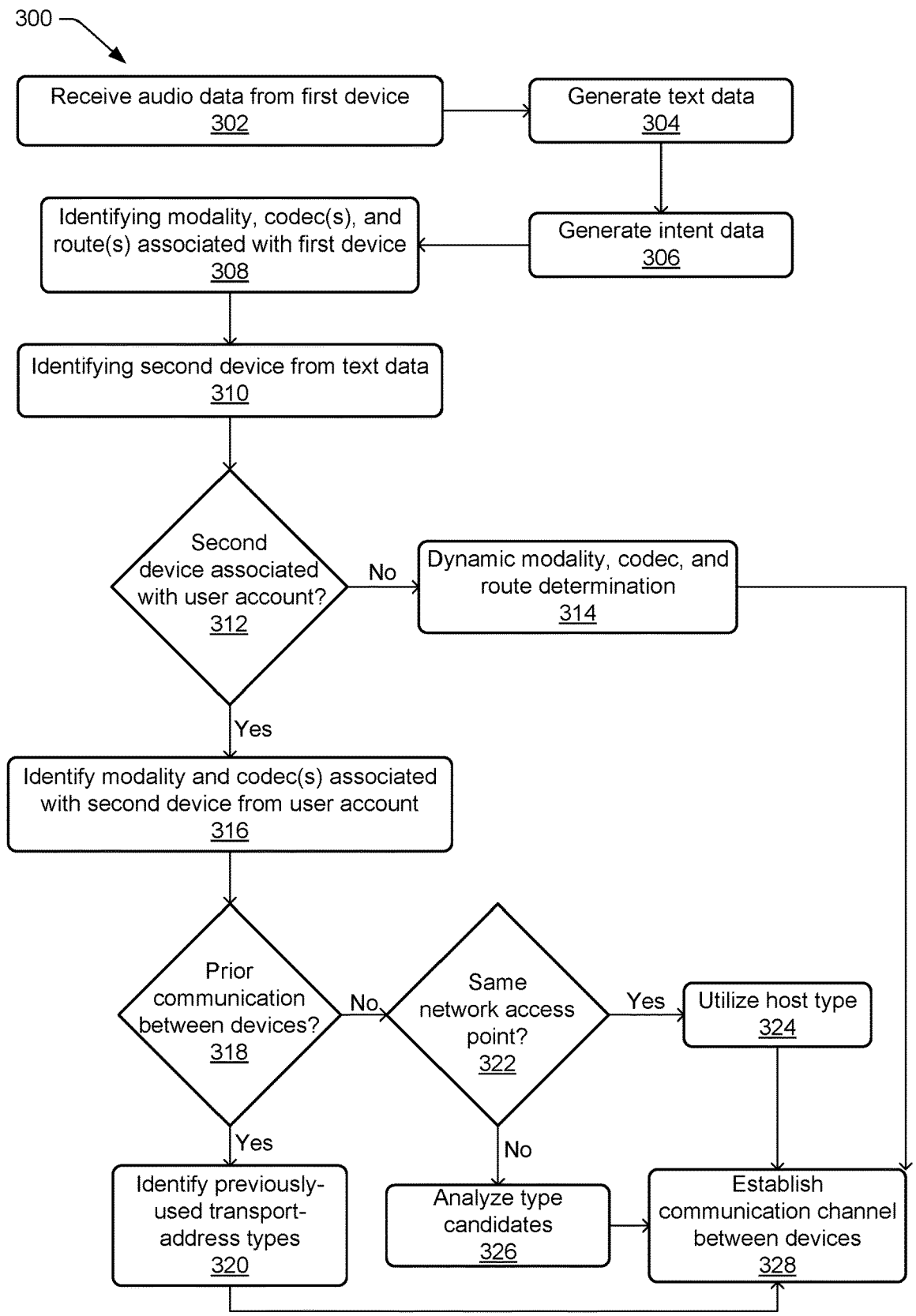
FIG. 3 illustrates a flow diagram of another example process for precomputing and/or utilizing precomputed communication parameters for establishing communication sessions.

FIGS. 2 and 3 illustrate various processes for generating precomputed communication parameters and/or utilizing precomputed communication parameters to establish communication channels. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 4-6B, 9, and 10, although the processes may be implemented in a wide variety of other environments, architectures and systems.

FIG. 2 illustrates a flow diagram of an example process 200 for utilizing precomputed communication parameters to establish a communication channel. The order in which the operations or steps are described is not intended to be construed as a limitation, and any number of the described operations may be combined in any order and/or in parallel to implement process 200. The process 200 is illustrated with the various operations being performed by one or more of the first device 102, the second device 104, and/or the remote system 106.

At block 202, the process 200 may include the first device 102 generating audio data. For example, microphones of the first device 102 may capture audio including a user utterance and may generate corresponding audio data. As used in this example, the user utterance may include "call bedroom."

At block 204, the process 200 may include the remote system 106 generating text data based at least in part on the audio data. For example, the audio data may be sent, via a network, to the remote system 106. An ASR component of the remote system 106 may process the audio data and generate corresponding text data. An NLU component of the remote system 106 may utilize the text data to determine intent data representing an intent of the user to, in these examples, establish a communication channel with another device, such as the second device 104. For example, the remote system 106, utilizing the NLU component, may determine that the text data corresponds to an intent to "call" or otherwise establish a communication channel with another device.

At block 206, the process 200 may include the remote system 106 identifying a device identifier for the first device 102. The device identifier may be sent as metadata along with the audio data. In other examples, the device identifier may have been identified and/or determined during setup of the first device 102 and/or in connection with previous audio data and/or signals sent from the first device 102 to the remote system 106. In these examples, data representing the device identifier may be stored in a user registry in association with a user account associated with the first device 102 and/or in a communications data configured to store information associated with establishing communications channels.

It should be understood that while examples are provided where the remote system receives audio data representing a user utterance requesting establishment of a communication channel, the innovations described herein may additionally or alternatively be initiated and/or implemented utilizing other types of input data, such as input data representing inputs to a graphical user interface of a device associated with the user. In these examples, the input data may be used instead of or in addition to the audio data to precompute communication parameters.

At block 208, the process 200 may include the remote system 106 identifying communication parameters such as at least one modality, at least one codec, and at least one type candidate associated with the first device 102. In examples, the remote system 106 may attempt to identify the communication parameters to effectuate the intent of establishing the communication channel. To do so, the remote system 106 may access information stored in association with the user registry and/or the communications database, as described more fully below. In the example provided above, the remote system 106 may access the information indicating the modalities, the codecs, and the transport-address types associated with the first device 102. This information may be accessed without the remote system 106 requesting such information from the first device 102.

At block 210, the process 200 may include the remote system 106 identifying a device identifier of the second device 104. For example, the NLU component may be utilized to determine one or more values or fields associated with the "call" intent. Here, for example, the value may include "bedroom" as a naming indicator of the device that is to be called. The remote system 106 may utilize the naming indicator to determine an associated device identifier, such as from information stored in association with the user registry and/or the communications database.

At block 212, the process 200 may include the remote system 106 identifying communications parameters such as at least one modality, at least one codec, and at least one transport-address type associated with the second device 104. The remote system 106 may identify the communications parameters based at least in part on information stored in association with the user registry and/or the communications database. For example, the second device 104 may be associate with a user account. The user account may be the same as the user account associated with the first device 102, or the accounts may differ. One or more of the communications parameters may have been identified and/or determined during setup of the second device 104 and/or in connection with previous audio data and/or signals sent from the second device 104 to the remote system 106.

At block 214, the process 200 may include the remote system 106 identifying a modality, codec(s), and a transport-address type for connection between the first device 102 and the second device 104. For example, a common modality as between the first device 102 and the second device 104 may be selected. Additionally, codec(s) that are configured to work together as between the first device 102 and the second device 104 may be selected. Additionally, the remote system 106 may determine whether the first device 102 and the second device 104 are associated with the same network access point. In examples where the devices 102, 104 are associated with the same network access point identifier, a host transport-address type that utilizes the network access point may be selected for use. In these examples, the remote system 106 has identified the communication parameters to be used and may utilize those parameters to establish the communication channel.

Additionally, or alternatively, in examples where the first device 102 and the second device 104 are not associated with the same network access point and/or when communications between the devices 102, 104 using the network access point are indicated as less than favorable, the remote system 106 may attempt to identify alternate transport-address types, such as server-reflexive types and/or relay types. In examples, as described herein, information indicating which transport-address types are available to and/or are utilized by the first device 102 and the second device 104 may be stored in association with the user registry and/or the communications database. One or more of these data sources may be queried to determine the transport-address types available to each device 102, 104. The remote system 106 may then determine which transport-address type is associated with both devices 102, 104 and/or which transport-address type is indicated to be most favorable for use.

At block 216, the process 200 may include the remote system 106 establishing and/or causing to be established a communication channel between the first device 102 and the second device 104. For example, the remote system 106 and/or another system may cause a communication channel to be established with the first device 102 and the second device 104 such that the audio data is at least one of encoded or decoded using the codec and is sent and received between the first device 102 and the second device 104 using the transport-address type. In examples, the remote system 106 may generate directive data representing a directive for one or more other components of the remote system 106 and/or another system to establish the communication channel.

At block 218, the process 200 may include the second device 104 sending and/or receiving data representing communications with the first device 102. For example, depending on the identified modalities associated with the first device 102 and the second device 104, audio data and/or text data may be sent from the first device 102 to the second device 104. Also, audio data and/or text data may be sent from the second device 104 to the first device 102.

At block 220, the process 200 may include the first device 102 sending and/or receiving data representing communications with the second device. The sending and/or receiving of data may be performed in the same or a similar manner as described with respect to block 218.

In examples, the use of precomputed communication parameters, as described herein, may result in the successful establishment of a communication channel. However, in other examples, the system may attempt to utilize the precomputed communication parameters to establish a communication channel but, for a litany of reasons, the communication channel may not be established and/or the established communication channel may be less than optimal. In these examples, the system may be configured to attempt to establish the communication channel using dynamic parameter computation wherein the modalities, codecs, and/or types are determined on the fly by querying each device for such information and determining common modalities, codecs, and/or types between the devices. By so doing, the remote system may utilize dynamic parameter computation if a problem occurs using precomputed communication parameters.

Additionally, or alternatively, the remote system may identify and/or determine a period of time between establishment of a previous communication channel and a request to establish a new communication channel. In examples, the period of time may indicate that the previous communication channel was established recently. In these examples, the precomputed communication parameters will likely be accurate and are likely to result in a favorable and/or successful communication channel being established. In other examples, the period of time may indicate that the previous communication channel was established some time ago. In these examples, the precomputed communication parameters may be inaccurate and/or may be out of date. The remote system may identify and/or determine a threshold period of time and may analyze the period of time between establishment of the previous communication channel and the current request. If the period of time is less than the threshold period of time, the precomputed communication parameters may be utilized as described herein. If the period of time is more than the threshold period of time, dynamic parameter computation may be performed for some or all of the communication parameters.

Additionally, or alternatively, the remote system may determine communication parameters using the processes described herein and may, in parallel, determine communication parameters using dynamic parameter computation. In these examples, given the decreased latency using the processes described herein, a communication channel may be established using the precomputed communication parameters. The remote system may also determine communication parameters using dynamic parameter computation and the remote system may determine whether the communication parameters determined using dynamic parameter computation are more favorable than the precomputed communication parameters. In these examples, a communication channel may be established using the communication parameters determined dynamically and the communication channel established using the precomputed communication parameters may be joined or otherwise merged with the newly-established communication channel. In this way, the latency benefits of using the precomputed communication parameters may be obtained and the effectiveness of dynamic parameter computation may also be obtained.

FIG. 3 illustrates a flow diagram of an example process 300 for utilizing precomputed communication parameters to establish a communication channel. The order in which the operations or steps are described is not intended to be construed as a limitation, and any number of the described operations may be combined in any order and/or in parallel to implement process 300. The process 300 is illustrated with the various operations being performed the remote system 106, by way of example.

At block 302, the process 300 may include receiving audio data from a first device, such as a first voice-enabled device. The audio data may have been generated by microphones of the first device and may correspond to audio representing a user utterance to, for example, "call bedroom."

At block 304, the process 300 may include generating text data corresponding to the audio data. For example, an ASR component of the remote system may generate the text data based at least in part on the audio data. In this example, the text data may present the phrase "call bedroom."

At block 306, the process 300 may include generating intent data corresponding to the text data. For example, a NLU component of the remote system may generate the intent data based at least in part on the text data. In this example, the intent data may represent a "call" intent, which may be associated with establishing a communication channel between the first device and another device. The intent data may also include a payload and/or value associated with the "call" intent. In this example, the payload may be associated with a naming indicator for the device intended to be called, which is "bedroom" in this example.

It should be understood that while examples are provided where the remote system receives audio data representing a user utterance requesting establishment of a communication channel, the innovations described herein may additionally or alternatively be initiated and/or implemented utilizing other types of input data, such as input data representing inputs to a graphical user interface of a device associated with the user. In these examples, the input data may be used instead of or in addition to the audio data to precompute communication parameters.

At block 308, the process 300 may include identifying one or more modalities, one or more codecs, and one or more transport-address types associated with the first device. In examples, the remote system may attempt to identify communication parameters such as the modalities, codecs, and/or transport-address types to effectuate the intent of establishing the communication channel. To do so, the remote system may access information stored in association with the user registry and/or the communications database, as described more fully below. In the example provided above, the remote system may access the information indicating the modalities, the codecs, and the transport-address types associated with the first device. This information may be accessed without the remote system requesting such information from the first device.

At block 310, the process 300 may include identifying a second device to establish the communication channel with based at least in part on the text data. For example, the NLU component may be utilized to determine one or more values or fields associated with the "call" intent. Here, for example, the value may include "bedroom" as a naming indicator of the device that is to be called. The remote system may utilize the naming indicator to determine an associated device identifier, such as from information stored in association with the user registry and/or the communications database. The second device may be identified based at least in part on the associated device identifier.

At block 312, the process 300 may include determining whether the second device is associated with a user account. For example, user accounts associated with the remote system may also be associated with one or more related device identifiers. If the device identifier identified at block 310 is associated with a user account of the remote system, then that user account may be utilized in subsequent processes described herein. If the second device is not associated with a user account associated with the remote system, the process 300 may continue to block 314 where dynamic modality, codec, and type determination may take place. For example, parameters candidates may be requested from the second device. The second device may generate such parameter candidates and those candidates may be analyzed with respect to the communication parameters identified for the first device to determine which communication parameters should be used to establish the communication channel.

Returning to block 312, if the second device is associated with a user account, the process 300 may continue to block 316 where a modality and codec associated with the second device may be identified from the user account of the second device. Identifying the modality and codec associated with the second device may be performed in the same or a similar manner as described with respect to identifying the modality and codec associated with the first device.

At block 318, the process 300 may include determining whether one or more prior communications between the first device and the second device have occurred. If one or more prior communications have occurred, an indication of the transport-address type associated with the prior communication may be utilized, at block 320, to identify a previously-used transport-address type. That previously-used transport-address type may be identified as the transport-address type to be utilized to establish the presently-requested communication channel. If, at block 318, a prior communication was not established between the first device and the second device, then at block 322, the process 300 may include determining whether the first device and the second device are associated with the same network access point identifier. Indications of network access point associations between device may be stored in association with the user registry and/or communications database described herein.

If the first device and the second device are associated with the same network access point identifier, then at block 324, a host transport-address type that utilizes the network access point may be selected for use as the transport-address type to establish the communication channel. If the first device and the second device are not associated with the same network access point, then at block 326, the remote system may analyze type candidates associated with the first device and type candidates associated with the second device.

At block 328, the process 300 may include establish and/or causing to be established the communication channel between the first device and the second device. For example, the remote system and/or another system may cause a communication channel to be established with the first device and the second device such that the audio data is at least one of encoded or decoded using the codec and is sent and received between the first device and the second device using the transport-address type. In examples, the remote system may generate directive data representing a directive for one or more other components of the remote system and/or another system to establish the communication channel.

In examples, the use of precomputed communication parameters, as described herein, may result in the successful establishment of a communication channel. However, in other examples, the system may attempt to utilize the precomputed communication parameters to establish a communication channel but, for a litany of reasons, the communication channel may not be established and/or the established communication channel may be less than optimal. In these examples, the system may be configured to attempt to establish the communication channel using dynamic parameter computation wherein the modalities, codecs, and/or transport-address types are determined on the fly by querying each device for such information and determining common modalities, codecs, and/or transport-address types between the devices.

Figure 4:
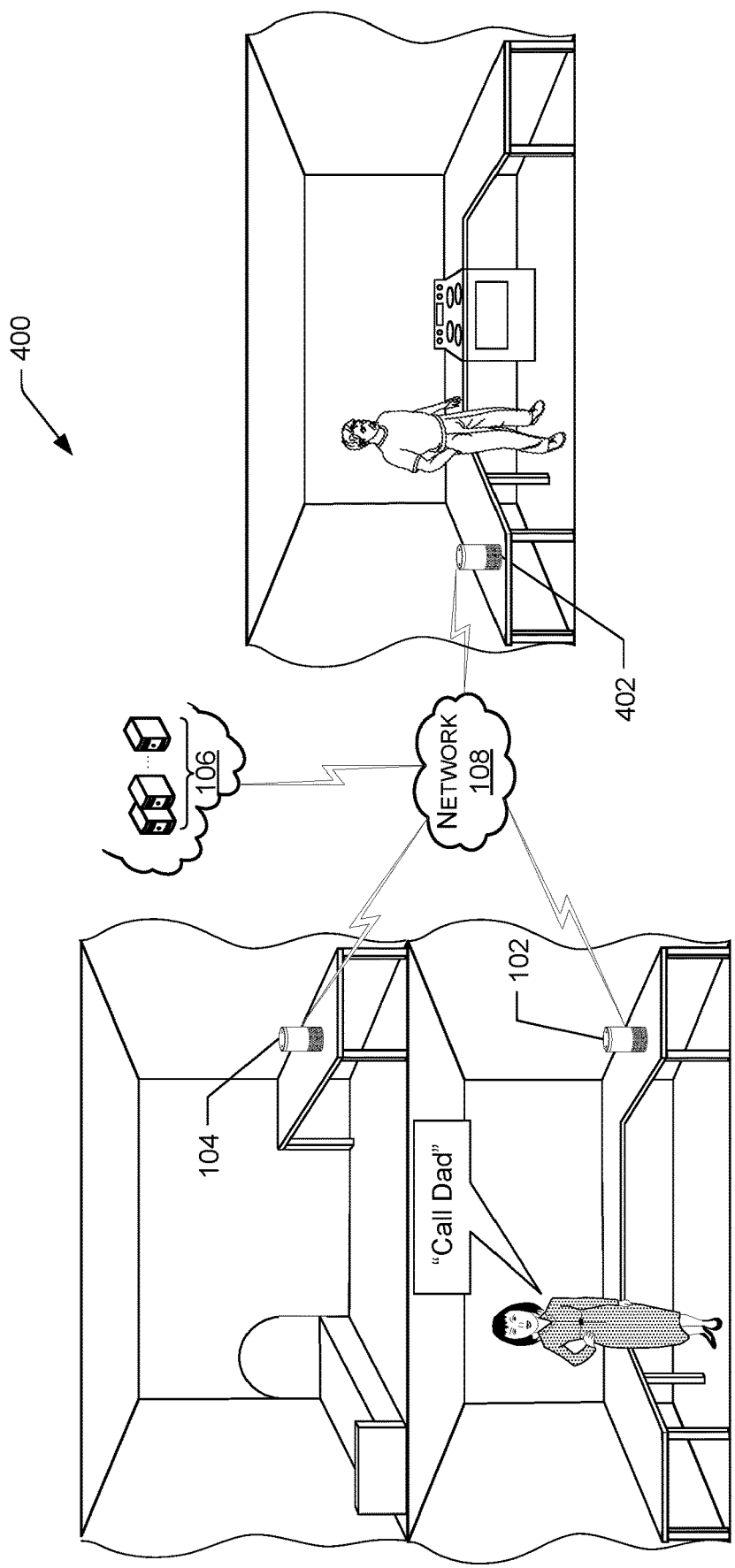
FIG. 4 illustrates a schematic diagram of an example environment for utilizing precomputed communication parameters for devices associated with different network access point identifiers.

FIG. 4 illustrates a schematic diagram of an example environment 400 for utilizing precomputed communication parameters for devices associated with different network access points. The environment 400 may include, for example, the first device 102 located in a first space, the second device 104 located in a second space, and a third device 402 located in a third space. In the example shown in FIG. 4, the first space may be an "office," the second space may be a "bedroom," and the third space may be a "kitchen." As shown in FIG. 4, the first space and the second space may be part of the same environment, depicted as the same home. The third space may be part of a different environment, depicted as another home located remote from the first home. The first device 102, the second device 104, and the third device 402 may be configured to communicate with each other, and/or with the remote system 106, via the network 108.

In this example, the user may provide a user utterance such as "call Dad." The corresponding audio data may be sent to the remote system 106 from the first device 102, and the remote system 106 may identify an intent associated with the user utterance. Here, the intent may be a "call" intent, and the remote system 106 may identify the payload associated with the intent to be "Dad." The remote system 106 may determine a device identifier associated with "Dad," such as based at least in part on "Dad" corresponding to a given user account and that user account being associated with a device identifier of a device, such as the third device 402.

The remote system 106 may identify modalities and/or codecs associated with the first device 102 based at least in part on information stored in the user registry and/or the communications database, as described more fully herein. Additionally, the remote system may identify modalities and/or codecs associated with the third device 402 based at least in part on information stored in the user registry and/or communications database. The remote system may also determine that the first device 102 is associated with a first network access point identifier while the third device 402 is associated with a second network access point identifier. In these examples, the remote system may determine that a host transport-address type is not an acceptable type to be utilized to establish a communication channel between the first device 102 and the third device 402.

In examples, the remote system may then determine which transport-address types are available to the first device 102 and the third device 402 and may select a transport-address type, such as a server-reflexive type or a relay type. Additionally, or alternatively, information may be stored in association with the user registry and/or the communications database that may indicate one or more previous transport-address types utilized for communication channels established between the first device 102 and the third device 402. The information may be utilized to select a transport-address type for a current call request. The communication channel may then be established between the first device 102 and the third device 402 utilizing the selected communication parameters.

Figure 5A:
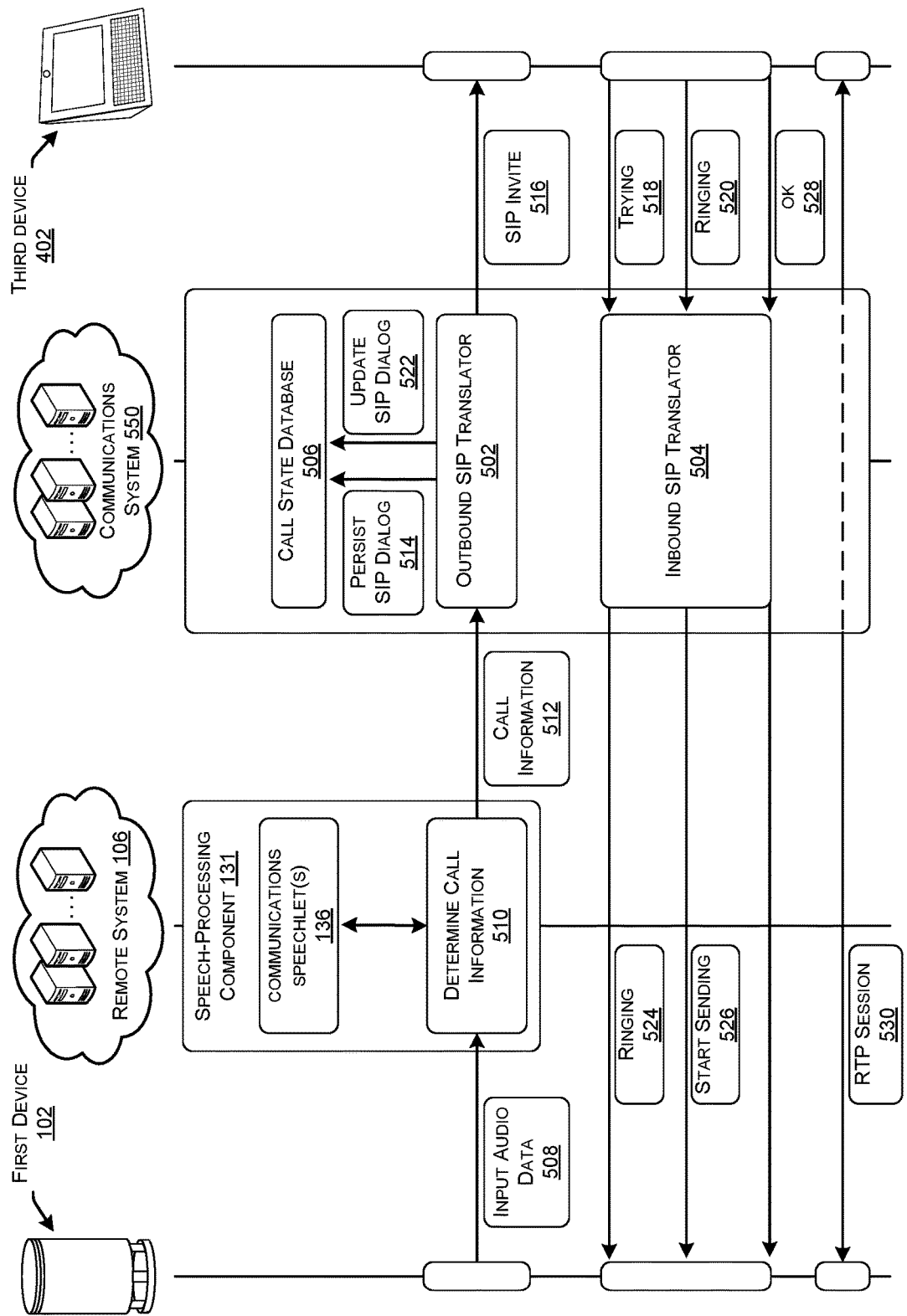
FIGS. 5A and 5B illustrate example techniques for a communications system to establish a flow of data between devices, and transitioning the flow of data to a different device.
Figure 5B:
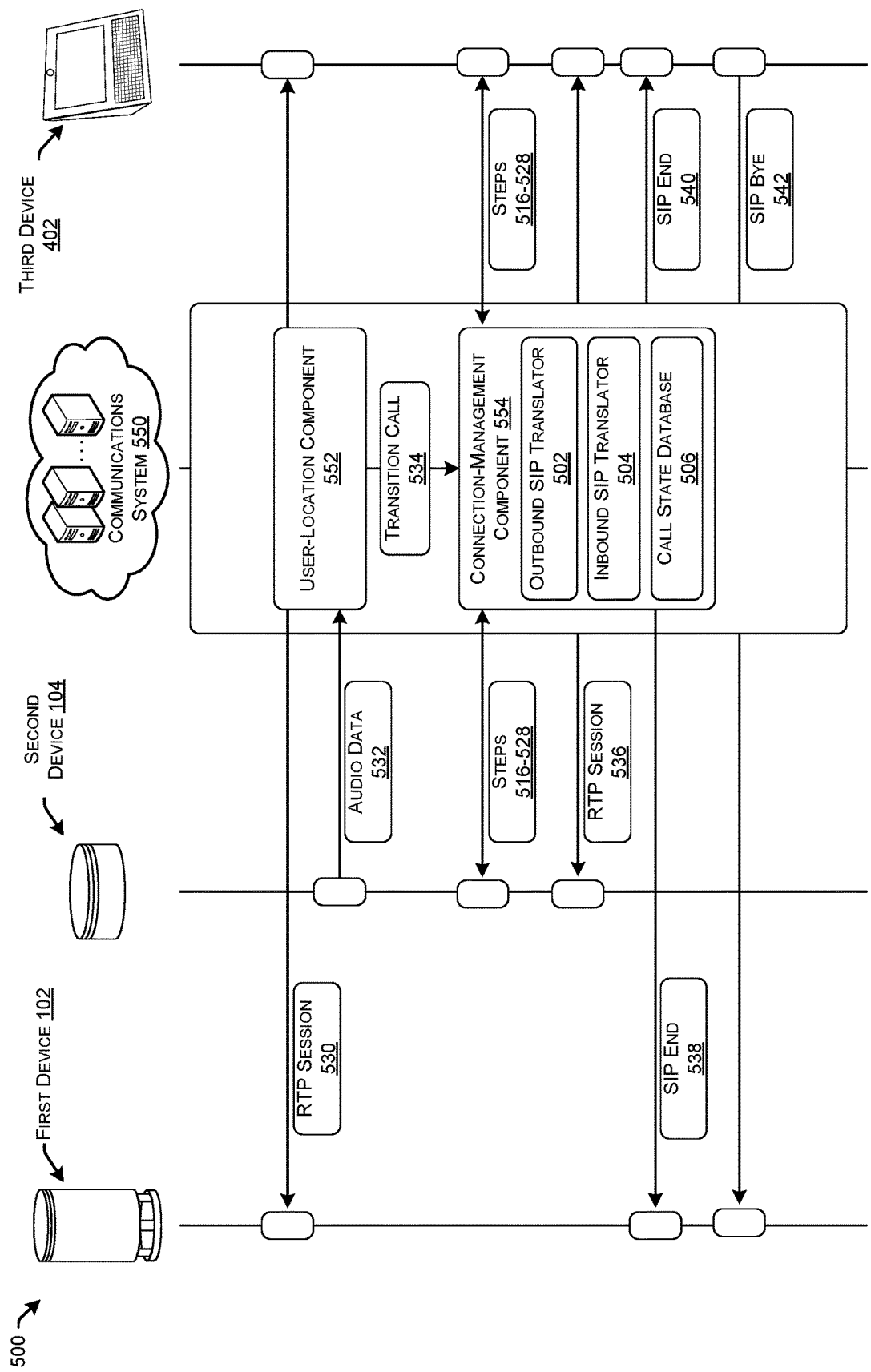

FIGS. 5A and 5B illustrate components that may be used to coordinate communications using a system, such as a communications system 122. The components shown in FIG. 5A carry out an example process 500 of signaling to initiate a communication session according to the present disclosure. In one example configuration, the remote system 106 is configured to enable voice commands (e.g., perform ASR, NLU, etc. to identify a voice command included in audio data), whereas the communications system 550 is configured to enable communication sessions (e.g., using session initiation protocol (SIP)). For example, the communications system 550 may send SIP messages to endpoints (e.g., recipient devices such as the second device 104) in order to establish a communication session for sending and receiving audio data and/or image data. The communication session may use network protocols such as real-time transport protocol (RTP), RTP Control Protocol (RTCP), Web Real-Time communication (WebRTC) and/or the like. For example, the communications system 550 may send SIP messages to initiate a single RTP media stream between two endpoints (e.g., direct RTP media stream between the first device 102 and the second device 104) and/or to initiate and facilitate RTP media streams between the two endpoints (e.g., RTP media streams between the first device 102 and the communications system 550 and between the communications system 550 and the second device 104). During a communication session, the communications system 550 may initiate two media streams, with a first media stream corresponding to incoming audio data from the first device 102 to the second device 104 and a second media stream corresponding to outgoing audio data from the second device 104 to the first device 102, although for ease of explanation this may be illustrated as a single RTP media stream.

As illustrated in FIG. 5A, the communications system 550 may include components to coordinate communications between devices, such as an outbound SIP translator, an inbound SIP translator, and a call state database 506. As shown, the first device 102 may send, at block 508, input audio data to the remote system 106, and the remote system 106 may determine, at block 510, call information using the input audio data. For example, one or more communications speechlets 136 may receive an intent from the NLU component 134, and in response to an intent to perform a call, the communications speechlet(s) 136 may engage the communications system 550, which may perform messaging and two-way communications as described herein below. The communications speechlet(s) 550 may include hardware, software, firmware, or the like that may be dedicated for determining communication commands. The speechlet component may be part of the remote system 106 or may be located in whole (or in part) with separate speechlet server(s). The communications speechlet(s) 136 may be configured to perform one or more actions. An ability to perform such an action may sometimes be referred to as a "skill." That is, a skill of the communications speechlet(s) 136 may configure the communications speechlet(s) 136 to execute specific functionality in order to provide data or produce some other output requested by a user. The communications speechlet(s) 136 may be configured to execute at least one skill/action, such as causing the communications system 550 to establish and maintain a communication channel.

The remote system 106 may send, at block 512, the call information to the communications system 550, such as via the communications speechlet(s) 136. The remote system 106 may determine the call information by performing ASR, NLU, etc., as discussed herein, and the call information may include a data source name (DSN), a number from which to call, a number to which to call, encodings, and/or additional information. For example, the remote system 106 may identify from which phone number and/or device identifier the user would like to initiate the call, to which phone number and/or device identifier the user would like to initiate the call, from which device 102 the user would like to perform the call, etc.

While FIG. 5A illustrates the remote system 106 sending the call information to the communications system 550 in a single step, such as at block 512, the disclosure is not limited thereto. Instead, the remote system 106 may send the call information to the first device 102 and the first device 102 may send the call information to the communications system 550 in order to initiate the call without departing from the disclosure. Thus, the remote system 106 may not communicate directly with the communications system 550 in step 512, but may instead instruct the first device 102 to connect to the communications system 550 in order to initiate the call.

The communications system 550 may include the outbound SIP translator 502, the inbound SIP translator 504, and the call state database 506. The outbound SIP translator 502 may include logic to convert commands received from the remote system 106 into SIP requests/responses and may handle sending outgoing SIP requests and sending responses to incoming SIP requests. After receiving the call information, the outbound SIP translator 502 may persist, at block 514, a SIP dialog using the call state database 506. For example, the DSN may include information such as the name, location, and driver associated with the call state database 506 (and, in some examples, a user ID and password of the user) and the outbound SIP translator 502 may send a SIP dialog to the call state database 506 regarding the communication session. The call state database 506 may persist the call state if provided a device ID and one of a call ID or a dialog ID. The outbound SIP translator 502 may send, at block 516, a SIP Invite to a SIP Endpoint, such as to the third device 402, a Session Border Controller (SBC), or the like).

The inbound SIP translator 504 may include logic to convert SIP requests/responses into commands to send to the first device 102 and/or the third device 402 and may handle receiving incoming SIP requests and incoming SIP responses. The third device 402 may send, at block 518, a TRYING message to the inbound SIP translator 504 and may send, at block 520, a RINGING message to the inbound SIP translator 534. The inbound SIP translator 534 may update, at block 522, the SIP dialog using the call state database 506 and may send, at block 524, a RINGING message to the first device 102.

When the communication session is accepted by the third device 402, the third device 402 may send, at block 528, an OK message to the inbound SIP translator 504, the inbound SIP translator 504 may send, at block 526, a startSending message to the first device 102. The startSending message may include information associated with an internet protocol address, a port, encoding, or the like required to initiate the communication session. Using the startSending message, the first device 102 may establish (530) an RTP communication session with the third device 402 via the communications system 550. In some examples, the communications system 550 may communicate with the first device 102 using the remote system 106 as an intermediary server.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

FIG. 5B illustrates examples of signaling to end a communication session according to the present disclosure. After establishing the RTP communication session 530 between the first device 102 and the third device 402, the second device 104 may send, at block 532, audio data and/or other data to determine proximity of the user to the communications system 550. A user-location component 552 may determine to transition the call, at block 534, from the first device 102 to the second device 104. A connection-management component 554 may then perform one or more of operations 516-528 with the second device 104 and the third device 402 to establish an RTP session, at block 536, between the second device 104 and the third device 402. In some examples, the connection-management component 554 may transition some, or all, or the data being transmitted in the call from the first device 102 to the second device 104. For instance, the first device 102 may still receive audio data and/or video data from the third device 402, may still send audio data and/or video data to the third device 402, or may quit communicating with the third device 402 altogether.

In examples where the connection-management component 554 transitions all of the data being communicated to the second device 104, the RTP communication session, at block 530, may be ended by the connection-management component 554. The communications system 550 may send, at block 540, an SIP end message to the third device 402, and also send, at block 538, an SIP end message to the first device 102. The outbound SIP translator 502 may update the session using the call state database 506 and may send, at block 542, a SIP BYE message to the third device 402. The remote user device may send an OK message to the inbound SIP translator 504 and the inbound SIP translator 504 may update the session using the call state database 506. In some examples, the inbound SIP translator 504 may send the OK message to the first device 102 to confirm that the communication session has been ended. Thus, the RTP communication session 530 may be ended between the first device 102 and the third device 402.

Although not illustrated, the third device 402 may send a SIP BYE message to the inbound SIP translator 504 and the inbound SIP translator 504 may update the session using the call state database 506. The inbound SIP translator 504 may send a stopSending message to the first device 102. The first device 102 may send an End message to the outbound SIP translator 502, the End message including a DSN. The outbound SIP translator 502 may then update the session using the call state database 506, and send an OK message to the third device 402. Thus, the RTP communication session 530 may be ended between the first device 102 and the third device 402.

While FIGS. 5A and 5B illustrate the RTP communication sessions 530 and 538 being established between the first device 102 and/or the second device 104 and the third device 402, the disclosure is not limited thereto and the RTP communication sessions 530 and 538 may be established between the devices 102, 104 and a telephone network associated with the third device 402 without departing from the disclosure.

FIGS. 6A and 6B illustrate example components for establishing a flow of data between devices. For instances, FIGS. 6A and 6B illustrates examples 600 and 608 of establishing media streams between devices according to the present disclosure. In examples, the first device 102 may have a publicly accessible IP address and may be configured to establish the RTP communication session directly with the third device 402. To enable the first device 102 to establish the RTP communication session, the communications system 550 may include Session Traversal of User Datagram Protocol (UDP) Through Network Address Translators (NATs) server(s), such as STUN server(s) 602. The STUN server(s) 602 may be configured to allow NAT clients, such as a first device 102 behind a firewall, to setup calls to a VoIP provider hosted outside of the local network by providing a public IP address, the type of NAT they are behind, and a port identifier associated by the NAT with a particular local port. As illustrated in FIG. 6A, the first device 102 may perform, at block 604, IP discovery using the STUN server(s) 602 and may use this information to set up an RTP communication session 606, such as a UDP communication, between the first device 102 and the third device 402 to establish a call.

In some examples, the first device 102 may not have a publicly accessible IP address. For example, in some types of NAT the first device 102 cannot route outside of the local network. To enable the first device 102 to establish an RTP communication session, the communications system 550 may include Traversal Using relays around NAT (TURN) server(s) 610. The TURN server(s) 610 may be configured to connect the first device 102 to the third device 402 when the first device 102 is behind a NAT. As illustrated in FIG. 6B, the first device 102 may establish, at block 612, an RTP session with the TURN server(s) 610 and the TURN server(s) 610 may establish, at block 614, an RTP session with the third device 402. Thus, the first device 102 may communicate with the third device 402 via the TURN server(s) 610. For example, the first device 102 may send outgoing audio data to the communications system 550 and the communications system 550 may send the outgoing audio data to the third device 402. Similarly, the third device 402 may send incoming audio/video data to the communications system 550 and the communications system 550 may send the incoming data to the first device 102.

In some examples, the communications system 550 may establish communication sessions using a combination of the STUN server(s) 602 and the TURN server(s) 610. For example, a communication session may be more easily established/configured using the TURN server(s) 610, but may benefit from latency improvements using the STUN server(s) 602. Thus, the system may use the STUN server(s) 602 when the communication session may be routed directly between two devices and may use the TURN server(s) 610 for all other communication sessions. Additionally, or alternatively, the system may use the STUN server(s) 602 and/or the TURN server(s) 610 selectively based on the communication session being established. For example, the system may use the STUN server(s) 602 when establishing a communication session between two devices (e.g., point-to-point) within a single network (e.g., corporate LAN and/or WLAN), but may use the TURN server(s) 610 when establishing a communication session between two devices on separate networks and/or three or more devices regardless of network(s). When the communication session goes from only two devices to three or more devices, the system may need to transition from the STUN server(s) 602 to the TURN server(s) 610. Thus, if the system anticipates three or more devices being included in the communication session, the communication session may be performed using the TURN server(s) 610.

Figure 7:
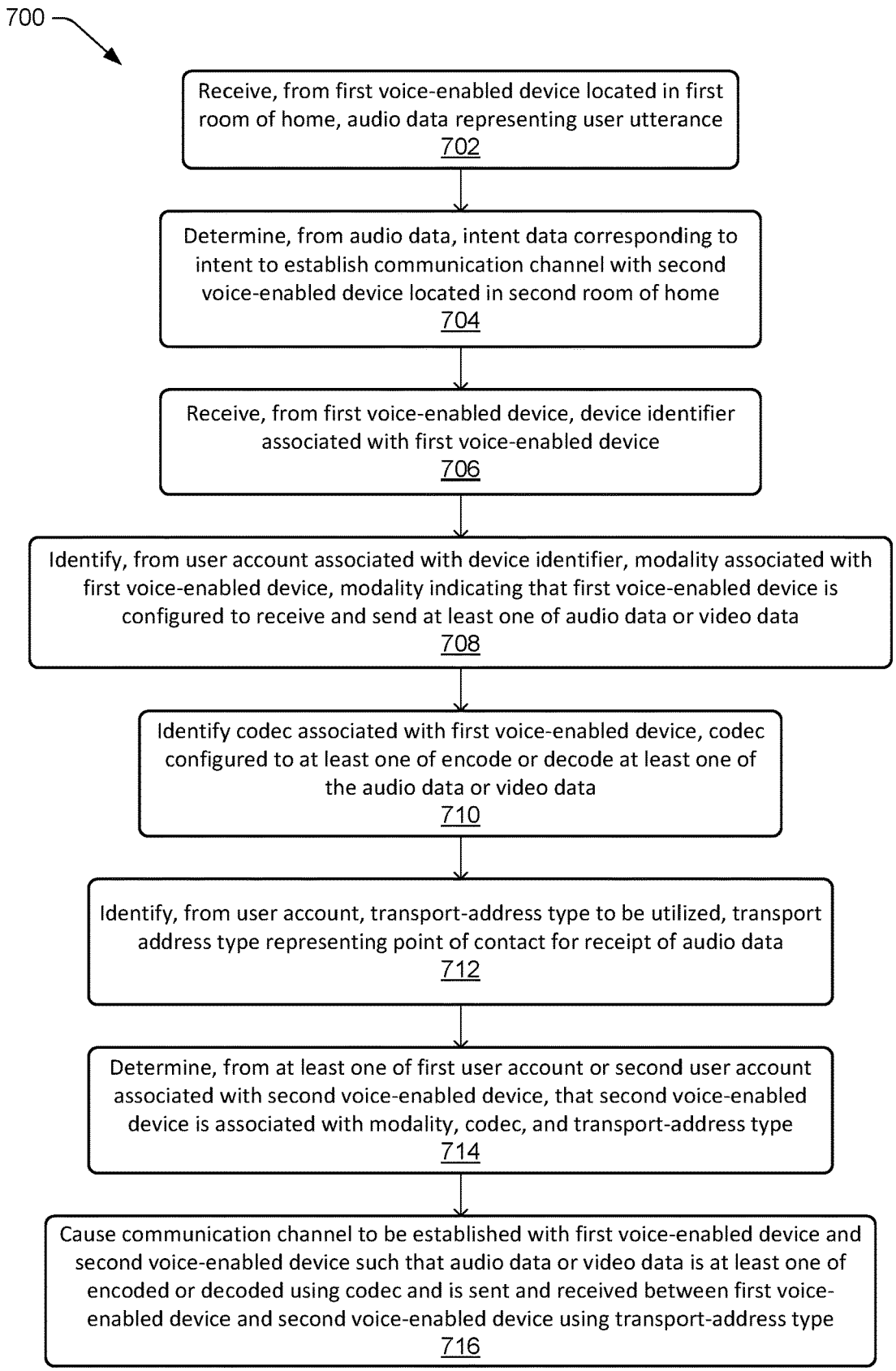
FIG. 7 illustrates a flow diagram of an example process for utilizing precomputed communication parameters for establishing communication sessions.
Figure 8:
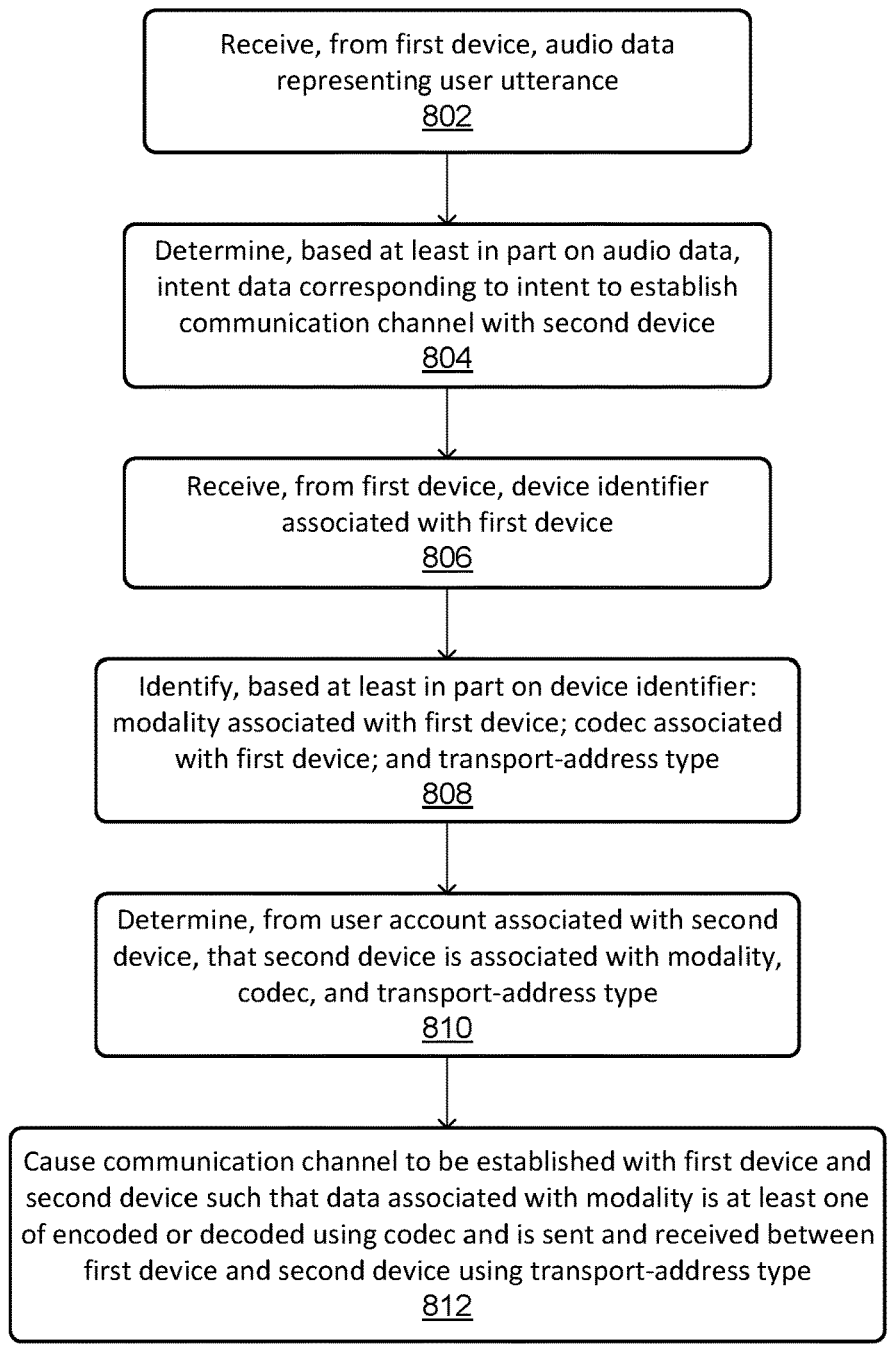
FIG. 8 illustrates a flow diagram of another example process for utilizing precomputed communication parameters for establishing communication sessions.

FIGS. 7 and 8 illustrate various processes for generating precomputed communication parameters and/or utilizing precomputed communication parameters to establish communication channels. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 4-6B, 9, and 10, although the processes may be implemented in a wide variety of other environments, architectures and systems.

FIG. 7 illustrates a flow diagram of an example process 700 for utilizing precomputed communication parameters to establish a communication channel. The order in which the operations or steps are described is not intended to be construed as a limitation, and any number of the described operations may be combined in any order and/or in parallel to implement process 700.

At block 702, the process 700 may include receiving, from a first voice-enabled device located in a first room of a home, audio data representing a user utterance. The first voice-enabled device may be described herein as a first device. The audio data may be generated by microphones of the first device, such as based on received audio representing the user utterance.

At block 704, the process 700 may include determining, from the audio data, intent data corresponding to an intent to establish a communication channel with a second voice-enabled device located in a second room of the home. The second voice-enabled device may be described herein as a second device. For example, an ASR component of the remote system may generate text data based at least in part on the audio data. In this example, the text data may present a phrase corresponding to the user utterance, such as "call bedroom." A NLU component of the remote system may generate the intent data based at least in part on the text data. In this example, the intent data may represent a "call" intent, which may be associated with establishing a communication channel between the first device and another device. The intent data may also include a payload and/or value associated with the "call" intent. In this example, the payload may be associated with a naming indicator for the device intended to be called, which is "bedroom" in this example.

At block 706, the process 700 may include receiving, from the first voice-enabled device, a device identifier associated with the first voice-enabled device. The device identifier may be sent as metadata along with the audio data. In other examples, the device identifier may have been identified and/or determined during setup of the first device and/or in connection with previous audio data and/or signals sent from the first device to the remote system. In these examples, data representing the device identifier may be stored in a user registry in association with a user account associated with the first device and/or in a communications data configured to store information associated with establishing communications channels.

At block 708, the process 700 may include identifying, from a first user account associated with the device identifier, a modality associated with the first voice-enabled device, the modality indicating that the first voice-enabled device is configured to receive and send at least one of audio data or video data. For example, the remote system may attempt to identify communication parameters such as the modalities, codecs, and/or transport-address types to effectuate the intent of establishing the communication channel. To do so, the remote system may access information stored in association with the user registry and/or the communications database, as described more fully herein. In the example provided above, the remote system may access the information indicating the modalities, the codecs, and the transport-address types associated with the first device. This information may be accessed without the remote system requesting such information from the first device.

At block 710, the process 700 may include identifying a codec associated with the first voice-enabled device, the codec configured to at least one of encode or decode the at least one of the audio data or the video data. Identifying the codec(s) may be performed in the same or a similar manner as described with respect to block 708.

At block 712, the process 700 may include identifying, from the first user account, a transport-address type to be utilized, the transport-address type including at least one of a host transport-address type, a server-reflexive transport-address type, or a relay transport-address type. The transport-address type representing a point of contact for receipt of the audio data and/or video data. For example, the remote system may determine whether the first device and the second device are associated with the same network access point identifier. In examples where the devices are associated with the same network access point identifier, a host transport-address type that utilizes the network access point identifier may be selected for use.

Additionally, or alternatively, in examples where the first device and the second device are not associated with the same network access point and/or when communications between the devices using the network access point are indicated as less than favorable, the remote system may attempt to identify alternate transport-address types, such as server-reflexive types and/or relay types. In examples, as described herein, information indicating which transport-address types are available to and/or are utilized by the first device and the second device may be stored in association with the user account and/or the communications database. One or more of these data sources may be queried to determine the transport-address types available to each device. The remote system may then determine which transport-address type is associated with both devices and/or which transport-address type is indicated to be most favorable for use. The remote system may then utilize the identified transport-address type, along with the identified modality and codec(s), to establish the communication channel.

Additionally, or alternatively, a previous communication channel configuration may have been utilized between the first device and the second device. Information indicating which modality, codec(s), and transport-address type was utilized with respect to that previous communication channel configuration may be stored in association with the user account and/or the communications database. This information may additionally, or alternatively, be utilized to identify the modality, codec(s), and/or transport-address types to be utilized when establishing a communication channel between the first device and the second device. By way of example, historical communication data indicating that a transport-address type was utilized for a previous communication channel configuration between the first device and the second device may be generated. The historical communication data may be stored in association with a user account and that information may be utilized to identify the transport-address type to be utilized to establish the communication channel.

At block 714, the process 700 may include determining, from at least one of the first user account or a second user account associated with the second voice-enabled device, that the second voice-enabled device is associated with the modality, the codec, and the transport-address type. Determining that the second device is associated with the modality, the codec, and the transport-address type may be performed in the same or a similar manner as described with respect to block 712.

In examples, the remote system may identify a device name associated with the second device based at least in part on analysis of the text data. A device identifier associated with the second device may be determined based at least in part on the identified device name. The remote system may determine that the device identifier is associated with a given modality, codec, and transport-address type, and the determination that the second device is associated with the modality, codec, and transport-address type may be based at least in part on determining that the device identifier is associated with the modality, codec, and transport-address type.

At block 716, the process 700 may include causing a communication channel to be established with the first voice-enabled device and the second voice-enabled device such that audio data or video data is at least one of encoded or decoded using the codec and is sent and received between the first voice-enabled device and the second voice-enabled device using the transport-address type. For example, the remote system and/or another system such as a communications system may utilize the identified transport-address type, along with an identified modality and codec(s), to establish the communication channel. In examples, the remote system may generate directive data representing a directive for one or more other components of the remote system and/or another system to establish the communication channel.

FIG. 8 illustrates a flow diagram of another example process 800 for utilizing precomputed communication parameters to establish a communication channel. The order in which the operations or steps are described is not intended to be construed as a limitation, and any number of the described operations may be combined in any order and/or in parallel to implement process 800.

At block 802, the process 800 may include receiving, from a first device, audio data representing a user utterance. The audio data may be generated by microphones of the first device, such as based on received audio representing the user utterance.

At block 804, the process 800 may include determining, based at least in part on the audio data, intent data corresponding to an intent to establish a communication channel with a second device. For example, an ASR component of the remote system may generate text data based at least in part on the audio data. In this example, the text data may present a phrase corresponding to the user utterance, such as "call bedroom." A NLU component of the remote system may generate the intent data based at least in part on the text data. In this example, the intent data may represent a "call" intent, which may be associated with establishing a communication channel between the first device and another device. The intent data may also include a payload and/or value associated with the "call" intent. In this example, the payload may be associated with a naming indicator for the device intended to be called, which is "bedroom" in this example.

At block 806, the process 800 may include receiving, from the first device, a device identifier associated with the first device. The device identifier may be sent as metadata along with the audio data. In other examples, the device identifier may have been identified and/or determined during setup of the first device and/or in connection with previous audio data and/or signals sent from the first device to the remote system. In these examples, data representing the device identifier may be stored in a user registry in association with a user account associated with the first device and/or in a communications data configured to store information associated with establishing communications channels.

At block 808, the process 800 may include identifying, based at least in part on the device identifier: a modality associated with the first device; a codec associated with the first device; and a transport-address type. For example, the remote system may attempt to identify communication parameters such as the modalities, codecs, and/or transport-address types to effectuate the intent of establishing the communication channel. To do so, the remote system may access information stored in association with the user registry and/or the communications database, as described more fully herein. In the example provided above, the remote system may access the information indicating the modalities, the codecs, and the transport-address types associated with the first device. This information may be accessed without the remote system requesting such information from the first device.

For example, the remote system may determine whether the first device and the second device are associated with the same network access point. In examples where the devices are associated with the same network access point, a host transport-address type that utilizes the network access point identifier may be selected for use.

Additionally, or alternatively, in examples where the first device and the second device are not associated with the same network access point identifier and/or when communications between the devices using the network access point identifier are indicated as less than favorable, the remote system may attempt to identify alternate transport-address types, such as server-reflexive types and/or relay types. In examples, as described herein, information indicating which transport-address types are available to and/or are utilized by the first device and the second device may be stored in association with the user account and/or the communications database. One or more of these data sources may be queried to determine the transport-address types available to each device. The remote system may then determine which transport-address type is associated with both devices and/or which transport-address type is indicated to be most favorable for use. The remote system may then utilize the identified transport-address type, along with the identified modality and codec(s), to establish the communication channel.

Additionally, or alternatively, a previous communication channel configuration may have been utilized between the first device and the second device. Information indicating which modality, codec(s), and transport-address type was utilized with respect to that previous communication channel configuration may be stored in association with the user account and/or the communications database. This information may additionally, or alternatively, be utilized to identify the modality, codec(s), and/or transport-address types to be utilized when establishing a communication channel between the first device and the second device. By way of example, historical communication data indicating that a transport-address type was utilized for a previous communication channel configuration between the first device and the second device may be generated. The historical communication data may be stored in association with a user account and that information may be utilized to identify the transport-address type to be utilized to establish the communication channel.

At block 810, the process 800 may include determining, from a user account associated with the second device, that the second device is configured to utilize the modality, the codec, and the transport-address type. Determining that the second device is associated with the modality, the codec, and the transport-address type may be performed in the same or a similar manner as described with respect to block 808. In examples, the remote system may identify a device name associated with the second device based at least in part on analysis of the text data. A device identifier associated with the second device may be determined based at least in part on the identified device name. The remote system may determine that the device identifier is associated with a given modality, codec, and transport-address type, and the determination that the second device is associated with the modality, codec, and transport-address type may be based at least in part on determining that the device identifier is associated with the modality, codec, and transport-address type.

At block 812, the process 800 may include causing a communication channel to be established with the first device and the second device such that data associated with the modality is at least one of encoded or decoded using the codec and is sent and received between the first device and the second device using the transport-address type. For example, the remote system and/or another system such as a communications system may utilize the identified transport-address type, along with an identified modality and codec(s), to establish the communication channel. In examples, the remote system may generate directive data representing a directive for one or more other components of the remote system and/or another system to establish the communication channel.

Additionally, or alternatively, the process 800 may include determining, based at least in part on the device identifier, a device type associated with the first device and determining that the device type is associated with the modality and the codec. In these examples, identifying the modality may be based at least in part on determining that the device type is associated with the modality. Additionally, identifying the codec may be based at least in part on determining that the device type is associated with the codec.

Additionally, or alternatively, the process 800 may include receiving an indication that the codec has been changed to an updated codec and storing data, such as in a user account associated with the first device, indicating that the first device is associated with the updated codec. The process 800 may also include determining, based at least in part on the data, that the updated codec is to be utilized to establish an additional communication channel between the second device and/or another device.

Additionally, or alternatively, the process 800 may include receiving an indication that a third device is to be added to the communication channel and determining, based at least in part on the user account, that the third device is associated with the modality, the codec, and the transport-address type. The process 800 may also include causing the third device to be included in the communication channel based at least in part on determining that the third device is configured to utilize the modality, the codec, and the transport-address type.

Figure 9:
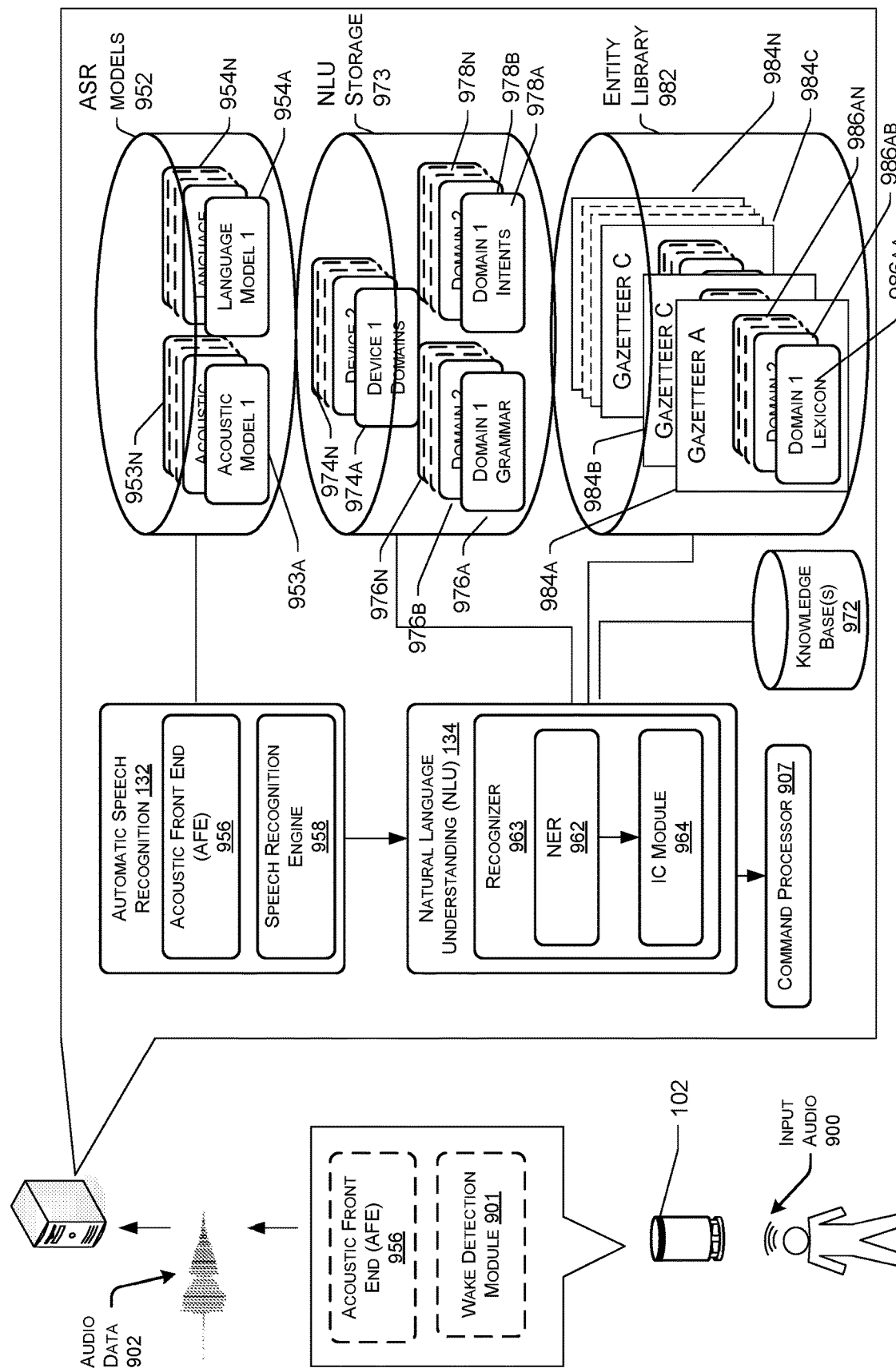
FIG. 9 illustrates a conceptual diagram of components of a speech processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same or different physical devices. Message between various components illustrated in FIG. 9 may occur directly or across a network 108. An audio capture component, such as a microphone 116 of the device 102, or another device, captures audio 900 corresponding to a spoken utterance. The device 102, using a wakeword detection module 901, then processes audio data corresponding to the audio 900 to determine if a keyword (such as a wakeword) is detected in the audio data. Following detection of a wakeword, the device 102 sends audio data 902 corresponding to the utterance to the remote system 106 that includes an ASR module 132. The audio data 902 may be output from an optional acoustic front end (AFE) 956 located on the device prior to transmission. In other instances, the audio data 902 may be in a different form for processing by a remote AFE 956, such as the AFE 956 located with the ASR module 132 of the remote system 106.

The wakeword detection module 901 works in conjunction with other components of the user device, for example a microphone to detect keywords in audio 900. For example, the device may convert audio 900 into audio data, and process the audio data with the wakeword detection module 901 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR module 132 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 132 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, call Bedroom." The wake detection module may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "call Bedroom."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 134 (e.g., server 106) may include various components, including potentially dedicated processor(s), memory, storage, etc. As shown in FIG. 9, an NLU component 134 may include a recognizer 963 that includes a named entity recognition (NER) module 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 132 based on the utterance input audio 900) and attempts to make a semantic interpretation of the text. That is, the NLU process determines the meaning behind the text based on the individual words and then implements that meaning. NLU processing 134 interprets a text string to derive an intent or a desired action from the user as well as the pertinent pieces of information in the text that allow a device (e.g., device 102) to complete that action. For example, if a spoken utterance is processed using ASR 132 and outputs the text "call Bedroom" the NLU process may determine that the user intended to establish a communication channel between a device from which the audio data was received and another device denoted as "Bedroom."

The NLU may process several textual inputs related to the same utterance. For example, if the ASR 132 outputs N text segments (as part of an N-best list), the NLU may process all N outputs to obtain NLU results.

As will be discussed further below, the NLU process may be configured to parse and tag to annotate text as part of NLU processing. For example, for the text "call Bedroom," "call" may be tagged as a command (to establish a communication channel) and "Bedroom" may be tagged as the naming identifier of the device with which to establish the communication channel.

To correctly perform NLU processing of speech input, an NLU process 134 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 962 receives a query in the form of ASR results and attempts to identify relevant grammars and lexical information that may be used to construe meaning. To do so, the NLU module 134 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) module 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "call," "talk," "drop in," "dial," to a "call" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 964 identifies potential intents for each identified domain by comparing words in the query to the words and phrases in the intents database 978. In some instances, the determination of an intent by the IC module 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC module 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "call Bedroom" is an identified intent, a grammar (976) framework or frameworks may correspond to sentence structures such as "call {Bedroom}."

For example, the NER module 962 may parse the query to identify words as subject, object, verb, preposition, etc., based on grammar rules and/or models, prior to recognizing named entities. The identified verb may be used by the IC module 964 to identify intent, which is then used by the NER module 962 to identify frameworks. A framework for the intent of "play a song," meanwhile, may specify a list of slots/fields applicable to play the identified "song" and any object modifier (e.g., specifying a music collection from which the song should be accessed) or the like. The NER module 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 962 may search the database of generic words associated with the domain (in the knowledge base 972). So, for instance, if the query was "call Bedroom," after failing to determine which device to establish a communication channel with, the NER component 962 may search the domain vocabulary for the phrase "Bedroom". In the alternative, generic words may be checked before the gazetteer information, or both may be tried, potentially producing two different results.

The output data from the NLU processing (which may include tagged text, commands, etc.) may then be sent to a command processor 907. The destination command processor 907 may be determined based on the NLU output. For example, if the NLU output includes a command to send a message, the destination command processor 907 may be a message sending application, such as one located on the user device or in a message sending appliance, configured to execute a message sending command. If the NLU output includes a search request, the destination command processor 907 may include a search engine processor, such as one located on a search server, configured to execute a search command. After the appropriate command is generated based on the intent of the user, the command processor 907 may provide some or all of this information to a text-to-speech (TTS) engine 1050. The TTS engine 1050 may then generate an actual audio file for outputting the audio data determined by the command processor 907 (e.g., "call starting," or "no answer was received"). After generating the file (or "audio data"), the TTS engine 1050 may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 134 during runtime operations where NLU operations are performed on text (such as text output from an ASR component 132). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC module 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
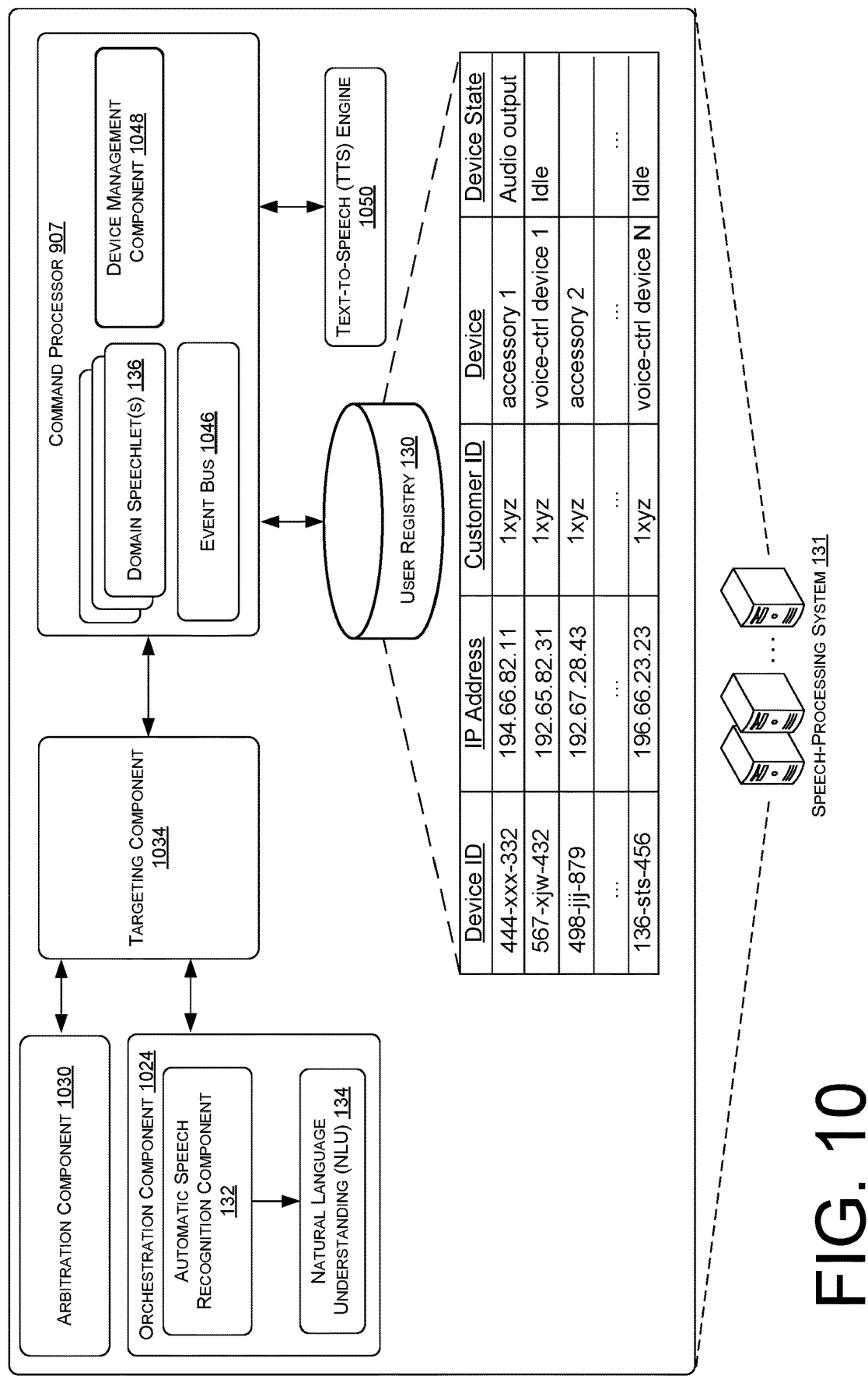
FIG. 10 illustrates a conceptual diagram of components of a speech processing system for generating precomputed parameters and/or utilizing precomputed parameters for establishing communication sessions.

FIG. 10 illustrates a conceptual diagram of components of a speech processing system 131 associating audio output commands with multiple devices, including a command processor 907 configured to generate a command that the selected voice-enabled device uses to respond to a user utterance. As used with respect to FIG. 9, a device may include a voice-enabled device 102, such as described with respect to FIG. 1. As illustrated in FIG. 9, the speech processing system 131, including the orchestration component 1024 comprising the ASR component 132 and the NLU component 134, may be coupled to the targeting component 1034 and provide the targeting component 1034 with the intent determined to be expressed in the user utterance. Further, the arbitration component 1030 may provide the ranked list of devices to the targeting component 1034, as well as device indicators (e.g., IP addresses, devices names, etc.) for one or more of the voice-enabled devices in the ranked list of devices. The targeting component 1034 may then perform techniques to determine a target device (e.g., a device to perform the requested operation), and provide various data to the command processor 907. For instance, the targeting component 1034 may provide the command processor 907 with various device identifiers of the voice-enabled devices, the determined target device, the determined intent and/or command, etc.

The command processor 907 and/or NLU component 134 may determine a domain based on the intent and, based on this determination, route the request corresponding to the audio data to the appropriate domain speechlet, such as the illustrated domain speechlets 136. The domain speechlet 136 may comprise any type of device or group of devices (e.g., hardware device, virtual devices or partitions, server, etc.), and may receive the text data and/or an intent associated with the audio signals and may determine how to respond to the request. For instance, the intent for a command "call Bedroom" may be routed to a communications domain speechlet 136, which controls establishment of communication channels.

Various types of domain speechlets 136 may be used to determine which devices to send commands to and/or to use in response to a user utterance, as well as the appropriate response and potential additional content (e.g., audio data). For example, the domain speechlets 136 may include a third party skills domain speechlet 136, which may handle intents associated with gaming, productivity, etc., a music domain speechlet 136, which may handle intents associated with music play requests (e.g., Amazon Music, Pandora, Spotify, iHeart, etc.), and/or an information domain speechlet 136, which may handle requests for information associated, for example, with the status of a particular device and/or content being utilized and/or output by a particular device and/or group of devices.

After the domain speechlet 136 generates the appropriate command, which may be described herein as directive data, based on the intent of the user, and/or provides additional content, such as audio data, to be output by one of the voice-enabled devices, the domain speechlet 136 may provide this information back to the speech system 131, which in turns provides some or all of this information to a text-to-speech (TTS) engine 1050. The TTS engine 1050 then generates an actual audio file for outputting the second audio data determined by the domain speechlet 136. After generating the file (or "audio data"), the TTS engine 1050 may provide this data back to the speech system 131.

The speech system 131 may then publish (i.e., write) some or all of this information to an event bus 1046. That is, the speech system 131 may provide information regarding the initial request (e.g., the speech, the text, the domain/intent, etc.), the response to be provided to the voice-enabled device, or any other information pertinent to the interaction between the voice-enabled device and the speech processing system 131 to the event bus 1046.

Within the speech processing system 131, one or more components or services may subscribe to the event bus 1046 so as to receive information regarding interactions between user devices and the speech processing system 131. In the illustrated example, for instance, the device management component 1048 may subscribe to the event bus 1046 and, thus, may monitor information regarding these interactions. In some examples, monitoring information in the event bus 1046 may comprise messages between various components of the speech processing system 131. For example, the targeting component 1034 may monitor the event bus 1046 to identify device state data for voice-enabled devices. In some examples, the event bus 1046 may "push" or send indications of events and/or device state data to the targeting component 1034. Additionally, or alternatively, the event bus 1046 may be "pulled" where the targeting component 1034 sends requests to the event bus 1046 to provide an indication of device state data for a voice-enabled device. The event bus 1046 may store indications of the device states for the devices, such as in a database (e.g., user registry 130), and using the stored indications of the device states, send the device state data for voice-enabled devices to the targeting component 1034. Thus, to identify device state data for a device, the targeting component 1034 may send a request to the event bus 1046 (e.g., event component) to provide an indication of the device state data associated with a device, and receive, from the event bus 1046, the device state data that was requested.

The device management component 1048 functions to monitor information published to the event bus 1046 and identify events that may trigger action. For instance, the device management component 1048 may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The device management component 1048 may reference the user registry 130 to determine which voice-enabled devices are associated with secondary devices, as well as determine device types, states, and other capabilities of these secondary devices. For instance, the device management component 1048 may determine, from the information published to the event bus 1046, an identifier associated with the voice-enabled device making the corresponding request or the voice-enabled device selected to respond to or act upon the user utterance. The device management component 1048 may use this identifier to identify, from the user registry 130, a user account associated with the voice-enabled device. The device management component 1048 may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The device management component 1048 may determine whether a particular event identified is associated with supplemental content. That is, the device management component 1048 may write, to a datastore, indications of which types of events and/or which primary content or responses are associated with supplemental content. In some instances, the speech processing system 131 may provide access to third-party developers to allow the developers to register supplemental content for output on secondary devices for particular events and/or primary content. For example, if a voice-enabled device is to output that the weather will include thunder and lightning, the device management component 1048 may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the device management component 1048 may store an association between the primary response or content (e.g., outputting of information regarding the world's largest mammal) and corresponding supplemental content (e.g., the audio data, image data, or the like). In some instances, the device management component 1048 may also indicate which types of secondary devices are to output which supplemental content. For instance, in the instant example, the device management component 1048 may store an indication that secondary devices of a class type "tablet" are to output a picture of a blue whale. In these and other instances, meanwhile, the device management component 1048 may store the supplemental content in association with secondary-device capabilities (e.g., devices with speakers output the audio commentary, devices with screens output the image, etc.).

The device management component 1048 may also determine how to transmit response and/or supplement content (and/or information acquiring the content) to the voice-enabled devices and/or the secondary devices. To make this determination, the device management component 1048 may determine a device type of the voice-enabled devices and/or secondary devices, capabilities of the device(s), or the like, potentially as stored in the user registry 130. In some instances, the device management component 1048 may determine that a particular device is able to communicate directly with the speech processing system 131 (e.g., over WiFi) and, thus, the device management component 1048 may provide the response and/or content directly over a network 108 to the secondary device (potentially via the speech system 131). In another example, the device management component 1048 may determine that a particular secondary device is unable to communicate directly with the speech processing system 131, but instead is configured to communicate with a voice-enabled device in its environment over short-range wireless networks. As such, the device management component 1048 may provide the supplement content (or information) to the speech system 131, which in turn may send this to the voice-enabled device, which may send the information over a short-range network to the secondary device.

The speech-processing system 131 may further include the user registry 130 that includes data regarding user profiles as described herein. The user registry 130 may be located part of, or proximate to, the speech processing system 131, or may otherwise be in message with various components, for example over the network 108. The user registry 130 may include a variety of information related to individual users, accounts, etc. that interact with the voice-enabled devices, and the speech processing system 131. For illustration, the user registry 130 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 130 may store indications of associations between various voice-enabled devices and/or secondary device, such as virtual clusters of devices, states of devices, and associations between devices and audio-session queues. The user registry 130 may represent clusters of devices and/or as single devices that can receive commands and disperse the commands to each device and/or in the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the command processor 907 and/or the domain speechlets 136 may determine, based on the stored device states in the user registry 130, a current device state of the voice-enabled devices. Rather than receiving device states for the voice-enabled devices, in metadata, the device states may already have been determined or received and stored in the user registry 130. Further, the user registry 130 may provide indications of various permission levels depending on the user. As an example, the speech system 131 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus 1046 may publish different events which indicate device states to various entities or components that subscribe to the event bus 1046. For instance, if an event of "call Bedroom" occurs for a voice-enabled device, the event bus 1046 may publish the indication of this event, and thus the device state of the voice-enabled device from which the audio data was received may be determined. Thus, various components, such as the targeting component 1034, may be provided with indications of the various device states via the event bus 1046. The event bus 1046 may further store and/or update device states for the voice-enabled devices in the user registry 130. The components of the speech processing system 131 may query the user registry 130 to determine device states.

A particular user profile may include a variety of data that may be used by the system 131. For example, a user profile may include information about what voice-enabled devices are associated with the user and/or user profile. The user profile may further indicate a network access point identifier for each of the devices associated with the user and/or user profile, user IDs for the devices, indications of the types of devices, current device states for the devices, modalities associated with the device, codecs associated with the device, and transport-address types associated with the device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
   one or more processors; and
   computer-readable media storing computer-executable instructions that, when executed by the one or more processors, cause the one or more processors to perform operations comprising:

receiving, from a first voice-enabled device located in a first room of a home, audio data representing a user utterance;

determining, from the audio data, intent data corresponding to an intent to establish a communication channel with a second voice-enabled device located in a second room of the home;

receiving, from the first voice-enabled device, a device identifier associated with the first voice-enabled device;

identifying, from a user account associated with the device identifier, a modality associated with the first voice-enabled device, the modality indicating that the first voice-enabled device is configured to receive and send audio data;

identifying a codec associated with the first voice-enabled device, the codec configured to at least one of encode or decode the audio data;

identifying, from the user account, a transport-address type to be utilized, the transport-address type representing a point of contact for receipt of the audio data;

determining, from the user account, that the second voice-enabled device is associated with the modality, the codec, and the transport-address type; and causing a communication channel to be established with the first voice-enabled device and the second voice-enabled device such that the audio data is at least one of encoded or decoded using the codec and is sent and received between the first voice-enabled device and the second voice-enabled device using the transport-address type.

2. The system of claim 1, the operations further comprising:

determining, from the user account, that the first voice-enabled device is associated with a network access point identifier;

determining, from the user account, that the second voice-enabled device is associated with the network access point identifier; and wherein identifying the transport-address type comprises identifying the transport-address type as a host transport-address type from determining that the first voice-enabled device and the second voice-enabled device are associated with the network access point identifier.

3. The system of claim 1, the operations further comprising:

generating historical communication data indicating that the transport-address type was utilized for a previous communication channel established between the first voice-enabled device and the second voice-enabled device;

storing the historical communication data in association with the user account; and wherein identifying the transport-address type from the user account comprises identifying the transport-address type from the historical communication data stored in association with the user account.

4. The system of claim 1, wherein the device identifier comprises a first device identifier, and the operations further comprise:

generating, from the audio data, text data representing the user utterance;

identifying, from the text data, a device name associated with the second voice-enabled device;

determining, from the device name, a second device identifier associated with the second voice-enabled device;

determining that the second device identifier is associated with the modality, the codec, and the transport-address type; and wherein determining that the second voice-enabled device is associated with the modality, the codec, and the transport-address type includes determining that the second device identifier is associated with the modality, the codec, and the transport-address type.

5. A method, comprising:

receiving, from a first device, a device identifier associated with the first device;

identifying, based at least in part on the device identifier:
a modality associated with the first device;
a codec associated with the first device; and
a transport-address type;

determining, from a user account associated with a second device, that the second device is configured to utilize the modality, the codec, and the transport-address type; and causing a communication channel to be established with the first device and the second device such that data associated with the modality is at least one of encoded or decoded using the codec and is sent and received between the first device and the second device using the transport-address type.

6. The method of claim 5, further comprising:

determining that the first device is associated with a network access point identifier;

determining that the second device is associated with the network access point identifier; and wherein identifying the transport-address type comprises identifying the transport-address type based at least in part on determining that the first device and the second device are associated with the network access point identifier.

7. The method of claim 5, further comprising:

generating communication data indicating that the transport-address type was utilized for a previous communication channel configuration between the first device and the second device; and wherein identifying the transport-address type comprises identifying the transport-address type based at least in part on the communication data.

8. The method of claim 5, wherein the device identifier comprises a first device identifier, and the method further comprises:

receiving, from the first device, audio data representing a user utterance;

generating, from the audio data, text data representing the user utterance;

identifying, from the text data, a device name associated with the second device;

determining, from the device name, a second device identifier associated with the second device;

determining that the second device identifier is associated with the modality, the codec, and the transport-address type; and wherein determining that the second device is associated with the modality, the codec, and the transport-address type is based at least in part on determining that the second device identifier is associated with the modality, the codec, and the transport-address type.

9. The method of claim 5, further comprising:
- determining, based at least in part on the device identifier, a device type associated with the first device;
- determining that the device type is associated with the modality, wherein identifying the modality is based at least in part on determining that the device type is associated with the modality; and
- determining that the device type is associated with the codec, wherein identifying the codec is based at least in part on determining that the device type is associated with the codec.

10. The method of claim 5, further comprising:
- receiving an indication that the codec has been changed to an updated codec;
- storing data, in a user account associated with the first device, indicating that the first device is associated with the updated codec; and
- determining, based at least in part on the data, that the updated codec is to be utilized to establish an additional communication channel with at least one of the second device or another device.

11. The method of claim 5, further comprising:
- determining that the first device is associated with a first network access point identifier;
- determining that the second device is associated with a second network access point identifier that differs from the first network access point identifier;
- determining, based at least in part on the first network access point identifier differing from the second network access point identifier, that the user account associated with the second device indicates a permission for the second device to establish communication channels with the first device; and
- wherein causing the communication channel to be established comprises causing the communication channel to be established based at least in part on the permission.

12. The method of claim 5, further comprising:
- receiving an indication that a third device is to be added to the communication channel;
- determining, based at least in part on the user account, that the third device is associated with the modality, the codec, and the transport-address type; and
- causing the third device to be included in the communication channel based at least in part on determining that the third device is configured to utilize the modality, the codec, and the transport-address type.

13. A system comprising:
- one or more processors; and
- computer-readable media storing computer-executable instructions that, when executed by the one or more processors, cause the one or more processors to perform operations comprising:
  - receiving, from the first device, a device identifier associated with the first device;
  - identifying, based at least in part on the device identifier:
    - a modality associated with the first device;
    - a codec associated with the first device; and
    - a transport-address type;
  - determining, from a user account associated with a second device, that the second device is associated with the modality, the codec, and the transport-address type; and
  - causing a communication channel to be established with the first device and the second device such that the audio data is at least one of encoded or decoded using the codec and is sent and received between the first device and the second device using the transport-address type.

14. The system of claim 13, the operations further comprising:
- determining that the first device is associated with a network access point identifier;
- determining that the second device is associated with the network access point identifier; and
- wherein identifying the transport-address type comprises identifying the transport-address type based at least in part on determining that the first device and the second device are associated with the network access point identifier.

15. The system of claim 13, the operations further comprising:
- generating communication data indicating that the transport-address type was utilized in a previous communication channel configuration between the first device and the second device; and
- wherein identifying the transport-address type comprises identifying the transport-address type based at least in part on the communication data.

16. The system of claim 13, wherein the device identifier comprises a first device identifier, and the operations further comprise:
- receiving, from the first device, audio data representing a user utterance;
- generating, from the audio data, text data representing the user utterance;
- identifying, from the text data, a device name associated with the second device;
- determining, from the device name, a second device identifier associated with the second device;
- determining that the second device identifier is associated with the modality, the codec, and the transport-address type; and
- wherein determining that the second device is configured to utilize the modality, the codec, and the transport-address type is based at least in part on determining that the second device identifier is associated with the modality, the codec, and the transport-address type.

17. The system of claim 13, the operations further comprising:
- determining, based at least in part on the device identifier, a device type associated with the first device;
- determining that the device type is associated with the modality, wherein identifying the modality is based at least in part on determining that the device type is associated with the modality; and
- determining that the device type is associated with the codec, wherein identifying the codec is based at least in part on determining that the device type is associated with the codec.

18. The system of claim 13, the operations further comprising:
- receiving an indication that the codec has been changed to an updated codec;
- storing data indicating that the first device is associated with the updated codec in a user account associated with the first device; and
- determining, based at least in part on the data, that the updated codec is to be utilized to establish an additional communication channel with at least one of the second device or another device.

19. The system of claim 13, the operations further comprising:

determining that the first device is associated with a first network access point identifier;

determining that the second device is associated with a second network access point identifier that differs from the first network access point identifier;

determining, based at least in part on the first network access point identifier differing from the second network access point identifier, that the user account associated with the second device indicates a permission for the second device to establish communication channels with the first device; and wherein causing the communication channel to be established comprises causing the communication channel to be established based at least in part on the permission.

20. The system of claim 13, the operations further comprising:

receiving an indication that a third device is to be added to the communication channel;

determining, based at least in part on the user account, that the third device is associated with the modality, the codec, and the transport-address type; and causing the third device to be included in the communication channel based at least in part on determining that the third device is configured to utilize the modality, the codec, and the transport-address type.

* * * * *